US009898826B2

(12) United States Patent
Takashima

(10) Patent No.: US 9,898,826 B2
(45) Date of Patent: Feb. 20, 2018

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventor: Hironori Takashima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/082,915

(22) Filed: Mar. 28, 2016

(65) Prior Publication Data

US 2016/0292870 A1    Oct. 6, 2016

(30) Foreign Application Priority Data

Mar. 31, 2015    (JP) ................................. 2015-072871

(51) Int. Cl.
    *G06T 7/00*    (2017.01)
    *G06T 7/11*    (2017.01)
    *G06T 7/187*    (2017.01)
(52) U.S. Cl.
    CPC .............. *G06T 7/11* (2017.01); *G06T 7/187* (2017.01); *G06T 2207/10028* (2013.01)
(58) Field of Classification Search
    USPC ........................................................ 382/154
    See application file for complete search history.

(56) References Cited

U.S. PATENT DOCUMENTS

| 8,891,590 B1* | 11/2014 | Cendrillon .............. H04L 1/009 370/500 |
| 2009/0138247 A1* | 5/2009 | Chow .................... G05B 17/02 703/2 |
| 2013/0241924 A1* | 9/2013 | Katou .................... G06T 15/10 345/419 |

FOREIGN PATENT DOCUMENTS

| JP | 2006185276 A | 7/2006 |
| WO | 2012114457 A1 | 8/2012 |

\* cited by examiner

*Primary Examiner* — Jerome Grant, II
(74) *Attorney, Agent, or Firm* — Canon U.S.A., Inc. IP Division

(57) ABSTRACT

An information processing apparatus inputs shape data indicating shapes and positional relationships of a plurality of objects; based on the shape data, in a space formed by a plurality of blocks each having a predetermined size, generates block data in which a corresponding attribute of an object or a space is allocated to each of the plurality of blocks; determines a part of blocks adjacent to a block having the attribute of the object in the block data as a block used for detection processing of a difference of contacted states of the objects between the shape data and the block data; and performs the detection processing by using the determined block as being used for the detection processing among the blocks adjacent to the block having the attribute of the object.

17 Claims, 20 Drawing Sheets

| FACE ID | COUNTERPART COMPONENT | DISTANCE | NORMAL DIRECTION |
|---------|----------------------|----------|------------------|
| FACE 31 | COMPONENT 402 | 10 mm | +x |
| FACE 32 | COMPONENT 403 | 25 mm | -y |
| FACE 33 | COMPONENT 403 | 0 mm | -y |
| FACE 34 | COMPONENT 404 | 5 mm | -y |
| FACE 35 | NONE | - | -x |
| FACE 36 | COMPONENT 405 | 30 mm | +y |

FIG. 10A

| ELEMENT 13 | ELEMENT 14 | ELEMENT 15 | ELEMENT 16 | ELEMENT 17 | ELEMENT 18 | ELEMENT 19 | ELEMENT 20 | ELEMENT 01 |
|---|---|---|---|---|---|---|---|---|
| ELEMENT 12 | ELEMENT 27 | | ELEMENT 28 | ELEMENT 29 | ELEMENT 30 | ELEMENT 31 | ELEMENT 21 | ELEMENT 02 |
| ELEMENT 11 | ELEMENT 10 | | ELEMENT 26 | ELEMENT 25 | ELEMENT 24 | ELEMENT 23 | ELEMENT 22 | ELEMENT 03 |
| | | | ELEMENT 09 | ELEMENT 08 | ELEMENT 07 | ELEMENT 06 | ELEMENT 05 | ELEMENT 04 |

FIG. 10B

| FACE | COUNTERPART COMPONENT | DISTANCE | NORMAL DIRECTION | FORMING ELEMENT | ADJACENT ELEMENT | MAXIMUM ELEMENT LENGTH IN OUT-OF-PLANE DIRECTION |
|---|---|---|---|---|---|---|
| FACE 31 | COMPONENT 402 | 10 mm | +x | ELEMENT 21, 22 | ELEMENT 01-04 | 15 mm |
| FACE 32 | COMPONENT 403 | 25 mm | -y | ELEMENT 22, 23 | ELEMENT 04, 05 | 15 mm |
| FACE 33 | COMPONENT 403 | 0 mm | -y | ELEMENT 23, 24 | ELEMENT 06, 07 | 15 mm |
| FACE 34 | COMPONENT 404 | 5 mm | -y | ELEMENT 24-27 | ELEMENT 08-11 | 15 mm |
| FACE 35 | NONE | - | -x | ELEMENT 27, 28 | ELEMENT 11-15 | 15 mm |
| FACE 36 | COMPONENT 405 | 30 mm | +y | ELEMENT 21, 28-32 | ELEMENT 01, 15-20 | 15 mm |

FIG. 13

| FACE ID | COUNTERPART COMPONENT | MATERIAL (OWN COMPONENT) | MATERIAL (COUNTERPART COMPONENT) | DISTANCE | NORMAL DIRECTION |
|---|---|---|---|---|---|
| FACE 31 | COMPONENT 402 | IRON | IRON | 10 mm | +x |
| FACE 32 | COMPONENT 403 | IRON | COPPER | 25 mm | -y |
| FACE 33 | COMPONENT 403 | IRON | COPPER | 0 mm | -y |
| FACE 34 | COMPONENT 404 | IRON | RESIN | 5 mm | -y |
| FACE 35 | NONE | IRON | - | - | -x |
| FACE 36 | COMPONENT 405 | IRON | STAINLESS STEEL | 30 mm | +y |

FIG. 20A

| ELEMENT NUMBER | ADJACENT FACE | FORMING FACE |
|---|---|---|
| 0001 | FACE 01 | FACE 02 |
| 0002 | - | - |
| 0003 | FACE 02 | FACE 01 |
| 0004 | FACE 02 | - |
| ... | ... | ... |
| xxxx | FACE xx | FACE xx |

FIG. 20B

| FACE ID | COMPONENT IN CONTACT | CORRECTION UNNECESSARY FLAG |
|---|---|---|
| FACE 01 | - | 0 |
| FACE 02 | - | 0 |
| FACE 03 | COMPONENT X | 0 |
| FACE 04 | - | 1 |
| FACE 05 | - | 0 |
| FACE 06 | COMPONENT Y | 0 |

INFORMATION PROCESSING APPARATUS, INFORMATION PROCESSING METHOD, AND PROGRAM

BACKGROUND OF THE INVENTION

Field of the Invention

The present invention relates to a technique of creating data used for numerical analysis by using a three-dimensional CAD model.

Description of the Related Art

A CAD (Computer Aided Design) system in which three-dimensional data indicating three-dimensional shapes and the positional relationships of components is able to be created has been widely used in the design of components and products. There is also a technique of not only designing shapes of components and products but analyzing physical characteristics of components and products by using CAD data created by the CAD system. When analyzing the physical characteristics of components and products by using the CAD data, the CAD data is converted into element divided data obtained by dividing a three-dimensional space into a plurality of blocks each having a predetermined size. At this time, there is a possibility that shapes of the components are not reproduced successfully, in particular, at a curved surface or an inclined surface of the components and contact relationships between the components will no longer be as intended in the element divided data at the time of the design. Particularly in electromagnetic analysis, when contact relationships between components made of conductive materials change, accuracy of computation is greatly affected, so that it is desired that the analysis is performed by using element divided data in which the contact relationships between the components in CAD data are maintained.

As a method for generating element divided data in which contact relationships between components in CAD data are maintained, WO 12/114457 describes that a designer specifies design guidelines for each shape characteristic of CAD data in advance and judges whether the specified design guidelines are observed in element divided data, and when not being observed, corrects the element divided data. Further, Japanese Patent Laid-Open No. 2006-185276 describes a technique wherein when components having contact relationships in CAD data are not in contact in the element divided data, a part which is not in contact is corrected to be in a contact state by hole filling.

However, when analysis of CAD data of a product having a few hundred components is carried out, it is difficult to specify design guidelines for each shape characteristic as in the technique disclosed in WO 12/114457. Further, the technique disclosed in WO 12/114457 has a problem in which it is difficult to detect a change of contact relationships for a part other than the characteristic feature specified in advance. In addition, the technique disclosed in Japanese Patent Laid-Open No. 2006-185276 has a problem in which processing takes time because it is necessary to check a change of the contacted state with respect to all surfaces in which the components in the CAD data are in contact.

SUMMARY OF THE INVENTION

In the invention, a processing amount required to generate element divided data in which a contacted state of components in CAD data is maintained is reduced.

In order to solve the aforementioned problem, an information processing apparatus according to the invention includes: an input unit configured to input shape data indicating shapes and positional relationships of a plurality of objects; a generation unit configured to, based on the shapes and the positional relationships of the plurality of objects, which are indicated by the shape data, in a space formed by a plurality of blocks each having a predetermined size, generate block data in which a corresponding attribute of an object or a space is allocated to each of the plurality of blocks; a determination unit configured to determine a part of blocks adjacent to a block having the attribute of the object in the block data as a block used for processing for detecting a difference between a contacted state of the plurality of objects in the shape data and a contacted state of the plurality of objects in the block data, based on the positional relationships or physical properties of the plurality of objects, which are indicated by the shape data; and a detection unit configured to detect the difference between the contacted states by using the block determined as being used for the detection processing by the determination unit among the blocks adjacent to the block having the attribute of the object.

Further features of the present invention will become apparent from the following description of exemplary embodiments with reference to the attached drawings.

BRIEF DESCRIPTION OF THE DRAWINGS

FIGS. 10A and 10B are diagrams for explaining processing performed in the second judgment unit of the exemplary embodiment 1.

FIG. 13 is a diagram illustrating an example of face information in an exemplary embodiment 2.

FIGS. 20A and 20B are tables illustrating an example of element information and face information.

DESCRIPTION OF THE EMBODIMENTS

Some embodiments to which the invention is applied will hereinafter be described in detail with reference to the accompanying drawings.

Exemplary Embodiment 1

Figure 1:
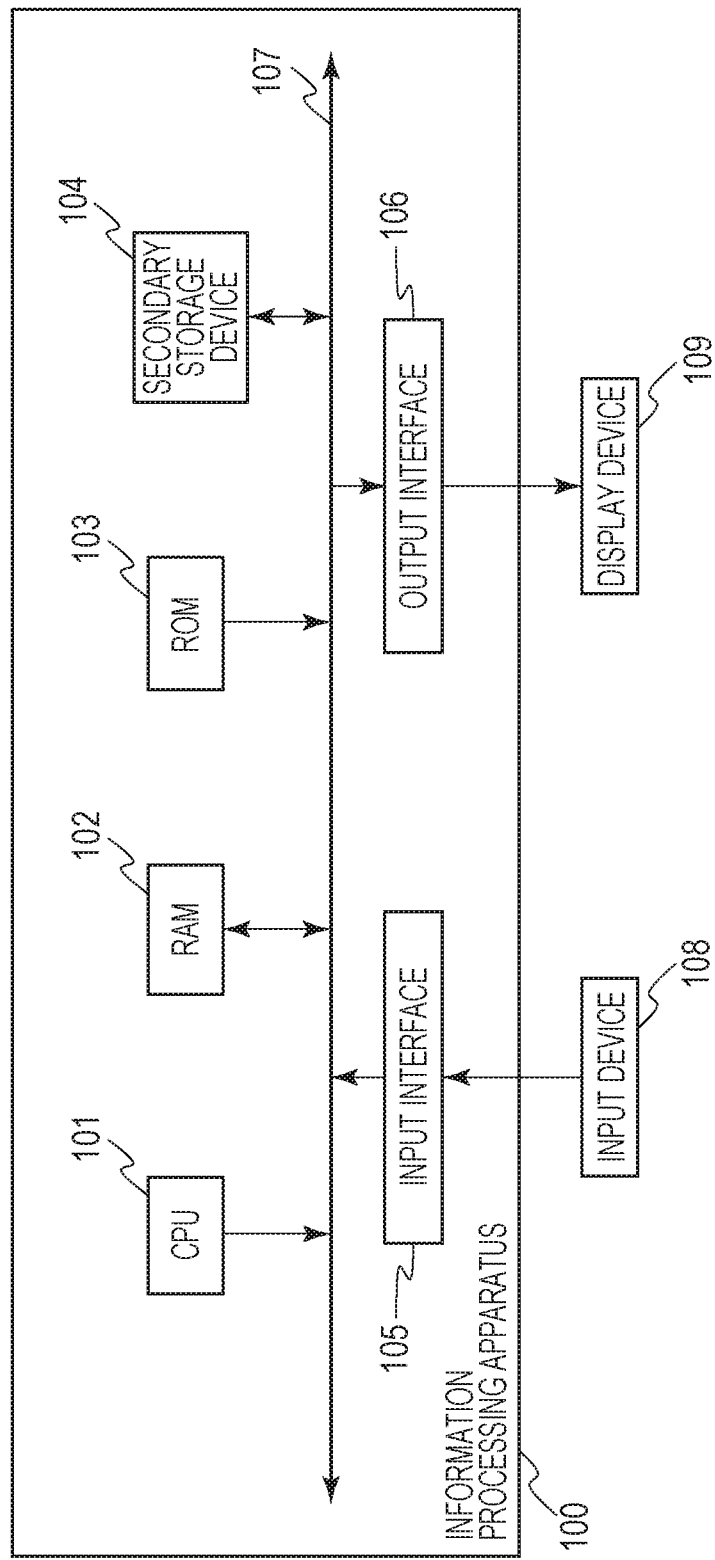
FIG. 1 is a block diagram illustrating a configuration of an information processing apparatus according to an exemplary embodiment 1.

In an exemplary embodiment 1, a description will be given for an example in which a processing amount required to generate an analysis model in which a contacted state of components in CAD data is maintained by limiting a face on which a change of a contacted state is checked when CAD data is converted into element divided data. FIG. 1 is a diagram illustrating one example of a configuration of an information processing apparatus according to the exemplary embodiment 1. The information processing apparatus 100 (hereinafter, referred to as processing apparatus 100) of the exemplary embodiment 1 includes a CPU 101, a RAM 102, a ROM 103, a secondary storage device 104, an input interface 105, and an output interface 106. Constituent units of the processing apparatus 100 are connected to each other by a system bus 107. In addition, the processing apparatus 100 is connected to an input device 108 through the input interface 105 and connected to a display device 109 through the output interface 106.

The CPU 101 is a processor which executes a program stored in the ROM 103 with the RAM 102 as a working memory and integrally controls each constituent unit of the processing apparatus 100 through the system bus 107. Thereby, various processing described below is executed.

The secondary storage device 104 is a storage device in which various data handled in the processing apparatus 100 is stored, and an HDD is used therefor in the present exemplary embodiment. The CPU 101 is able to write data to the secondary storage device 104 and read data stored in the secondary storage device 104 through the system bus 107. Note that, in addition to an HDD, various storage devices such as an optical disc drive and a flash memory may be used for the secondary storage device 104.

The input interface 105 is a serial bus interface, for example, USB or IEEE1394, and input of data, a command or the like from an external apparatus to the processing apparatus 100 is performed through the input interface 105. The processing apparatus 100 is connected to the input device 108, which serves as an input device such as a mouse or a keyboard, through the input interface 105, and a user is able to input various processing commands by using the input device 108.

The output interface 106 is a video image output interface, for example, DVI or HDMI (registered trademarks), and the processing apparatus 100 is connected to the display device 109 (various image display devices such as a liquid crystal display) through the output interface 106. The processing apparatus 100 displays an image confirming a command of the user on the display device 109 through the output interface 106. Note that, similarly to the input interface 105, a serial bus interface such as USB or IEEE1394 may be used for the output interface 106. Note that, there are other constituent units of the image processing apparatus 100, but they are not a main point of the invention, so description thereof will be omitted.

Figure 2:
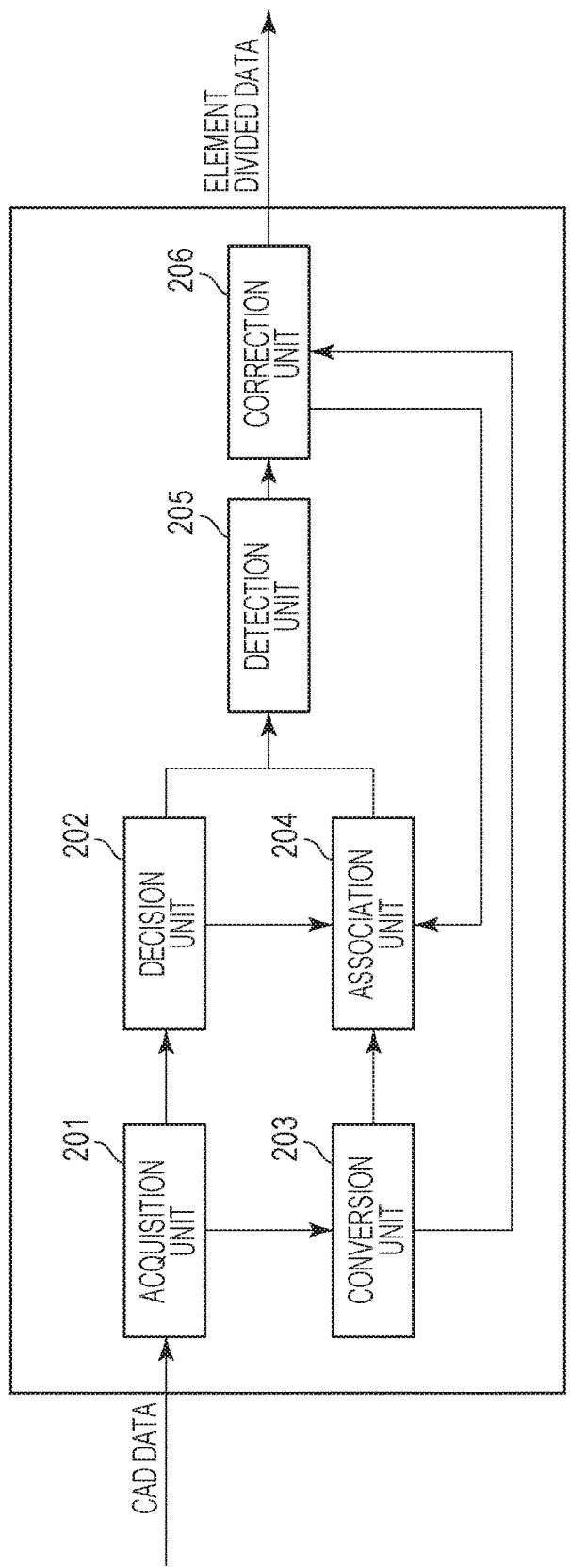
FIG. 2 is a block diagram illustrating a functional configuration of the information processing apparatus according to the exemplary embodiment 1.
Figure 3:
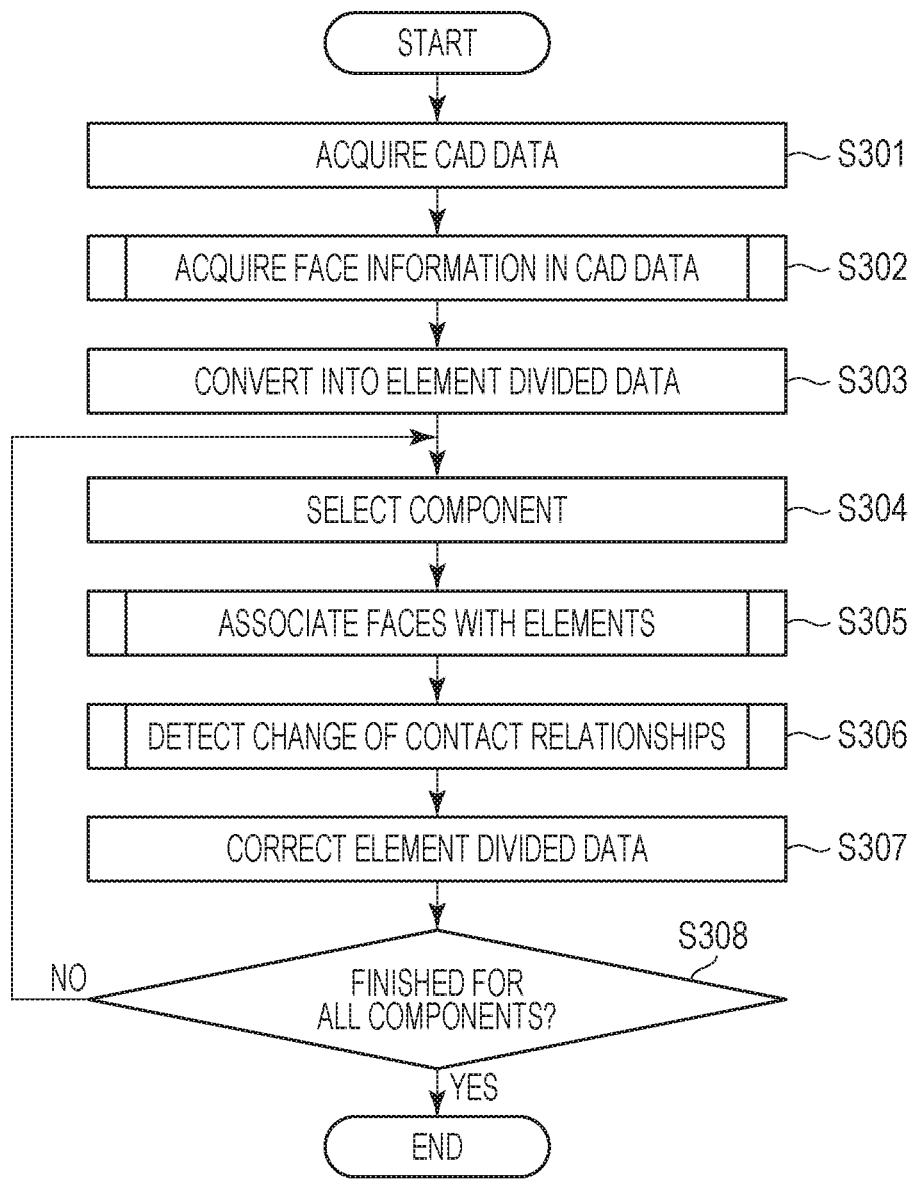
FIG. 3 is a flowchart illustrating a flow of processing performed in the information processing apparatus according to the exemplary embodiment 1.

Processing performed in the processing apparatus 100 of the exemplary embodiment 1 will be described below with reference to FIG. 2 and FIG. 3. FIG. 2 is a block diagram illustrating a functional configuration of the processing apparatus 100. The processing apparatus 100 provides functions for each constituent unit illustrated in FIG. 2 by executing the program stored in the ROM 103 by using the CPU 101 with the RAM 102 as a working memory and executes a series of processing illustrated in a flowchart in FIG. 3. Note that, all following processing do not need to be executed by the CPU 101, and the processing apparatus 100 may be configured so that a part or all of the processing is performed by one or more processing circuits other than the CPU 101. A flow of processing performed by each constituent unit will be described below.

Figure 4:
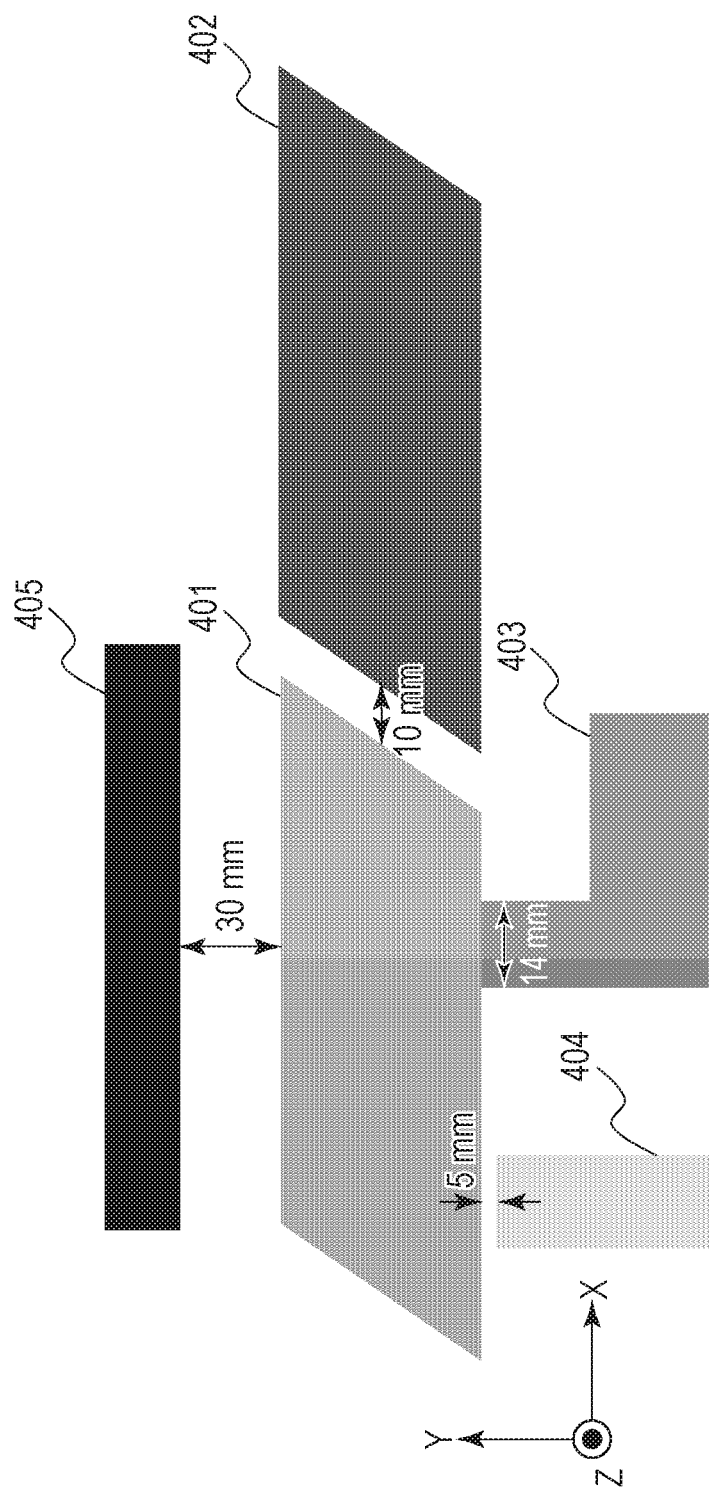
FIG. 4 is a diagram illustrating an example of CAD data.

At step S301, the acquisition unit 201 acquires CAD data for processing, which is stored in the secondary storage device 104 or the like. An example of CAD data used in the present exemplary embodiment is illustrated in FIG. 4. FIG. 4 is a diagram illustrating CAD data including three-dimensional shapes and the positional relationships of a plurality of components each having a simple shape. The CAD data used in the present exemplary embodiment is data indicating three-dimensional shapes and the positional relationships of components 401 to 405, and a data point corresponding to each component is linked with tag information indicating a corresponding component. The plurality of components are represented by a two-dimensional shape for convenience but are components with a three-dimensional shape having a dimension also in a Z direction. Note that, the CAD data input here is not limited to three-dimensional CAD data, and two-dimensional design data may be used. The acquisition unit 201 outputs the acquired CAD data to a determination unit 202 and a conversion unit 203.

At step S302, the determination unit 202 judges a contacted state of the respective components in the CAD data input from the acquisition unit 201 and determines face information indicating faces of the respective components. The processing here will be described below in detail. The determination unit 202 outputs first face information indicating the contacted state of the respective components in the CAD data to an association unit 204 and a detection unit 205.

Figure 5:
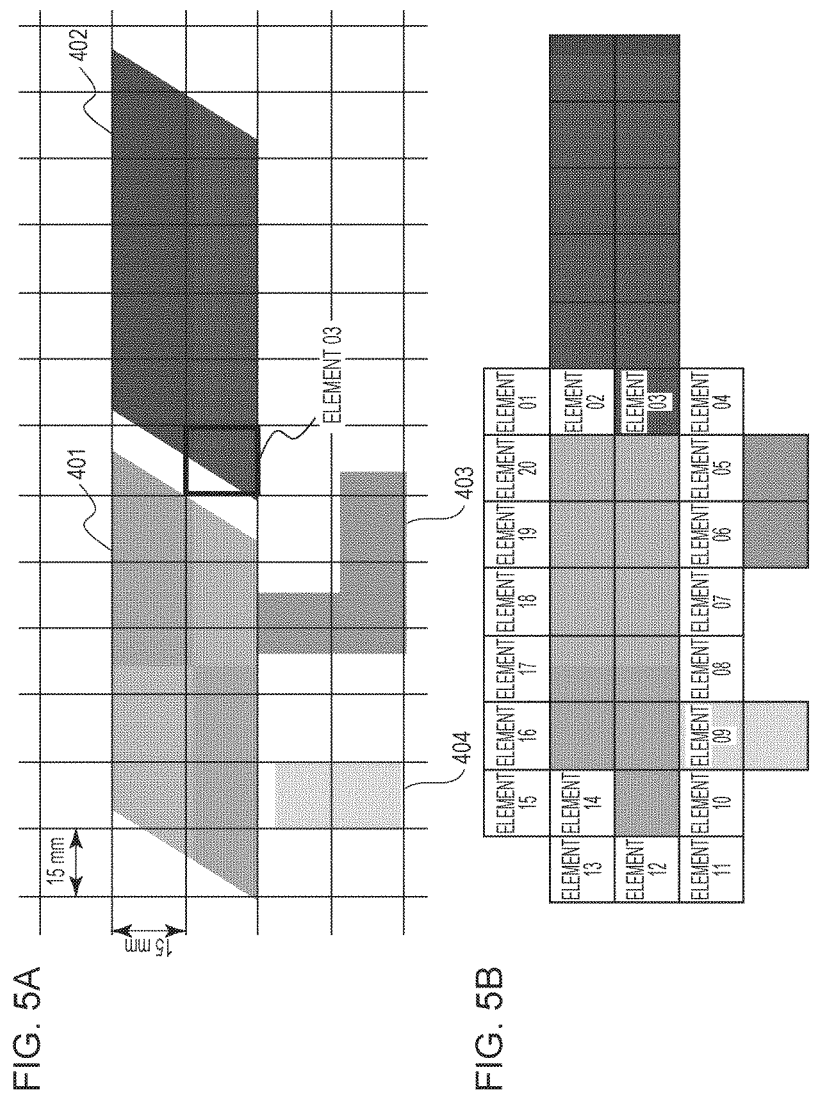
FIGS. 5A and 5B are diagrams illustrating an element division method of CAD data.

At step S303, the conversion unit 203 converts the CAD data input from the acquisition unit 201 to element divided data used for analysis. FIGS. 5A and 5B are diagrams illustrating an element division method in a Finite-Difference Time-Domain (FDTD) method which is an analysis method used in the present exemplary embodiment. In the FDTD method, the CAD data to be analyzed is divided into a plurality of cuboid elements, each side of which has a predetermined element length, parallel to XY, YZ, and ZX planes. Note that, the coordinate axes of X, Y and Z may be set optionally. The element length used here may be specified as any length by a user or may be specified automatically based on a wavelength of a frequency of an electromagnetic field that is desired to be calculated, or the like. Further, the element lengths do not need to be equal between the respective coordinate axes and may be set to be different between the respective coordinate axes. In the present exemplary embodiment, since the element length of 15 mm is uniformly set in the respective coordinate axes, each block sectioned at an interval of 15 mm as FIG. 5A serves as an element. An attribute of a component or a space whose ratio of a volume in each block is the greatest is allocated as an attribute of the block. That is, the processing performed here is processing wherein in a space formed of a plurality of blocks each having a predetermined size, based on shapes and positional relationships of a plurality of objects indicated by CAD data, a corresponding attribute of the object or the space is allocated to each of the plurality of blocks.

FIG. 5B is a diagram illustrating element divided data in which an attribute is allocated to each block as a result of element division. For example, a block corresponding to an element 03 includes an analysis space (an area in which no component exists and which corresponds to air) and a component 402, in which the component 402 has a larger volume ratio in FIG. 5A and an attribute of the component 402 is allocated to the element 03. Note that, though only elements corresponding to components 401 to 404 and elements surrounding the component 401 are represented in FIG. 5B for convenience of description, attributes are respectively allocated to the elements in the entire space. The conversion unit 203 outputs the generated element divided data to the association unit 204.

At step S304, the association unit 204 selects a component in which a change of a contacted state is to be checked. Here, a description will be given by assuming that the component 401 is selected first.

At step S305, regarding the component selected at step S304, the association unit 204 associates respective faces indicated by the first face information input from the determination unit 202 with the elements in contact with the respective faces among the elements of the element divided data input from the conversion unit 203. The association processing performed here will be described below in detail. The association unit 204 outputs, to the detection unit 205, second face information indicating association of the faces and the elements in the element divided data thus obtained.

At step S306, the detection unit 205 uses the first face information input from the determination unit 202 and the second face information input from the association unit 204 to detect a change of a contacted state of the component when the CAD data is converted into the element divided data. Then, an element whose attribute is to be corrected in the element divided data is determined, and information indicating a number of the element for which correction is performed and an attribute thereof after the correction is output to a correction unit 206. The processing performed here will be described below in detail. The detection unit 205 outputs, to the correction unit 206, the information indicating the element for which correction is performed.

Figure 6:
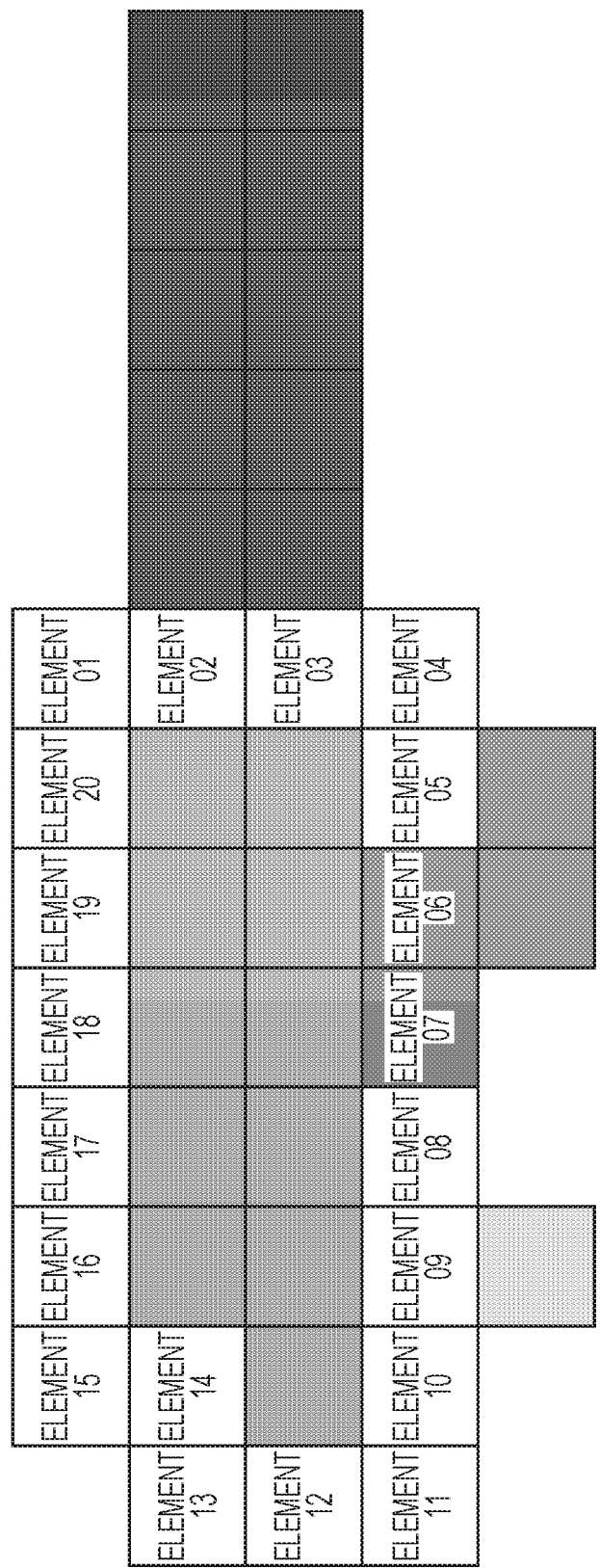
FIG. 6 is a diagram illustrating a method for correcting element divided data in the exemplary embodiment 1.

At step S307, the correction unit 206 performs correction for the element divided data input from the conversion unit 203, based on the information input from the detection unit 205. The correction in the present exemplary embodiment will be described below. FIG. 6 is a diagram illustrating an example in which correction is performed for the element divided data illustrated in FIG. 5B. In the element divided data illustrated in FIG. 5B, the contacted state of the respective components is changed from the CAD data illustrated in FIG. 5A. For example, although the component 402 and the component 405 do not contact the component 401 in the CAD data, both contact the component 401 in the element divided data. In addition, the component 403 contacts the component 401 in the CAD data but does not contact the component 401 in the element divided data.

Thus, the correction unit 206 corrects the element divided data so that the contacted state of the respective components has the same contacted state in the CAD data. Specifically, attributes of the element 03 and an element 09 are respectively corrected from the component 402 and a component 404 to the analysis space, and attributes of an element 06 and an element 07 are corrected from the analysis space to the component 403.

At step S308, the correction unit 206 judges whether the processing of step S304 to step S307 is performed for all the components. When it is judged that the processing of step S304 to step S307 is performed for all the components, the correction unit 206 outputs the element divided data for which correction is completed to the secondary storage device 104 and the display device 109, and ends the processing. When it is judged that the processing of step S304 to step S307 is not performed for all the components, the correction unit 206 outputs the element divided data for which correction has been performed to the association unit 204 and the detection unit 205, and the procedure returns to step S304 at which the association unit 204 selects a new component.

Figure 7:
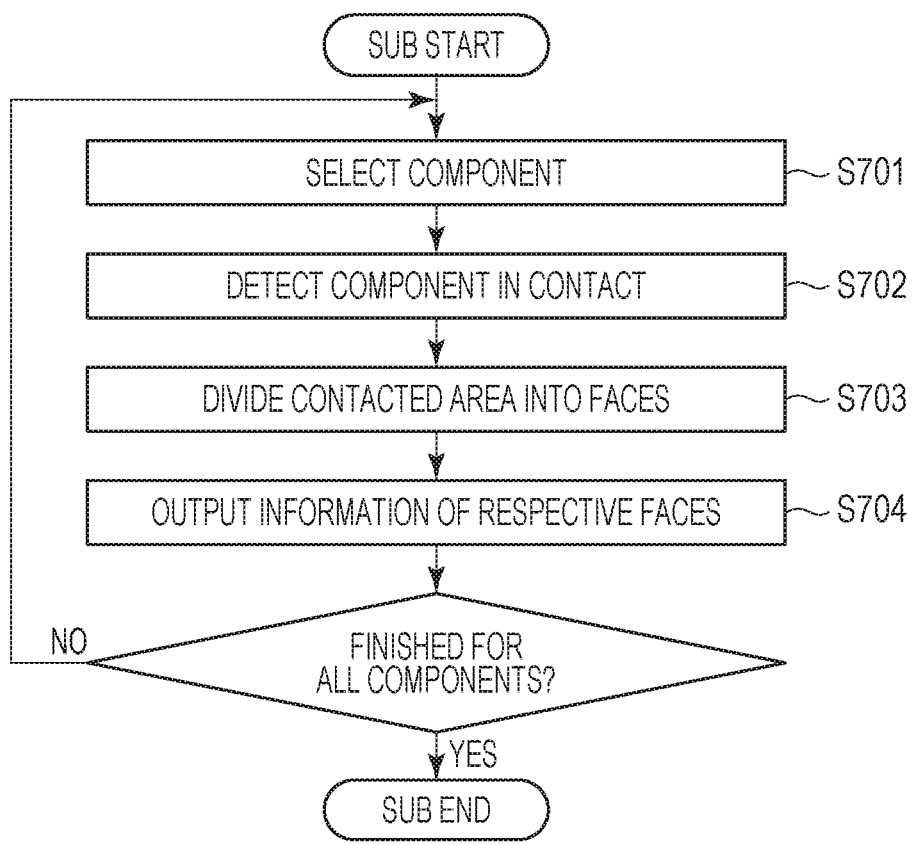
FIG. 7 is a flowchart illustrating a flow of processing performed in a first judgment unit of the exemplary embodiment 1.

The flow of the processing in the present exemplary embodiment is as described above. The processing at each of the steps will be described below in detail. First, the processing performed by the determination unit 202 (step S302) will be described in detail. FIG. 7 is a flowchart illustrating step S302 in detail.

At step S701, the determination unit 202 selects a component, whose contacted state is to be checked, in the CAD data input from the acquisition unit 201. Here, a description will be given by assuming that the component 401 is firstly selected. At step S702, the determination unit 202 detects a different component in contact with the component selected at step S701. The component in contact may be detected by a known method. For example, in the present exemplary embodiment, the determination unit 202 derives, for each of mesh points forming faces of the component, a distance to another object which exists in a normal direction of a face. The mesh point whose derived distance is smaller than a predetermined threshold is detected as being in contact with a different component. The component 403 is detected as the component in contact with the component 401 in the present exemplary embodiment.

Figures 8A, 8B:
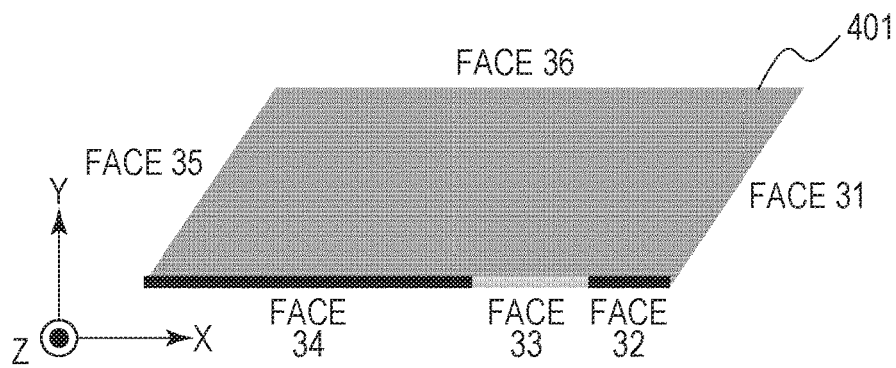
FIGS. 8A and 8B are diagrams for explaining face division processing in the exemplary embodiment 1.

At step S703, the determination unit 202 divides a contacted area with the different component detected at step S702 into different faces. FIGS. 8A and 8B are diagrams illustrating a face division method thereof. While the component 401 is represented as a parallelogram having four faces in FIG. 8A, a part of a bottom of the component 401 contacts the component 403 in the CAD data. The bottom of the component 401 is divided into different faces of an area in contact with the component 403 and an area not in contact therewith. That is, the bottom of the component 401 is divided into a face 32, a face 33, and a face 34.

At step S704, the determination unit 202 records information about the respective faces divided at step S703, and outputs the information to the association unit 204 and the detection unit 205 as the first face information. The determination unit 202 generates, as the first face information, data indicating an ID of each face, a number of a component which is closest to each face, a distance to the closest component, and a coordinate axis direction having the greatest components among components included in the normal direction of each face, as a list illustrated in FIG. 8B. Further, a coordinate of a mesh point forming each face is also extracted at a rougher interval compared to the CAD data and stored in the first face information. For example, the coordinate of the mesh point is extracted at an interval equivalent to an element length used for element division. Then, the first face information thus generated is output to the association unit 204 and the detection unit 205. Note that, a number of the closest component, a distance to the component, the greatest components of the coordinate axis direction included in the normal direction of each face are acquired when the contacted state of the components is detected at step S702. Note that, for example, when sizes of +x components and +y components included in the normal direction are equal, setting is performed in advance so as to give priority to either one of them, for example, to the +x components, and the direction to be recorded is determined based on the relationship which is set in advance. Though the faces of the component 401 are represented up to the face 36 for convenience of description, faces in a ±Z direction are also to be processed actually.

At step S705, the determination unit 202 judges whether the processing of steps S701 to S704 is performed for all the components in the input CAD data. When it is judged that the processing of steps S701 to S704 is not performed for all the components, the procedure returns to step S701 at which a new component is selected. When it is judged that the processing of steps S701 to S704 is performed for all the components, the procedure ends.

Figure 9:
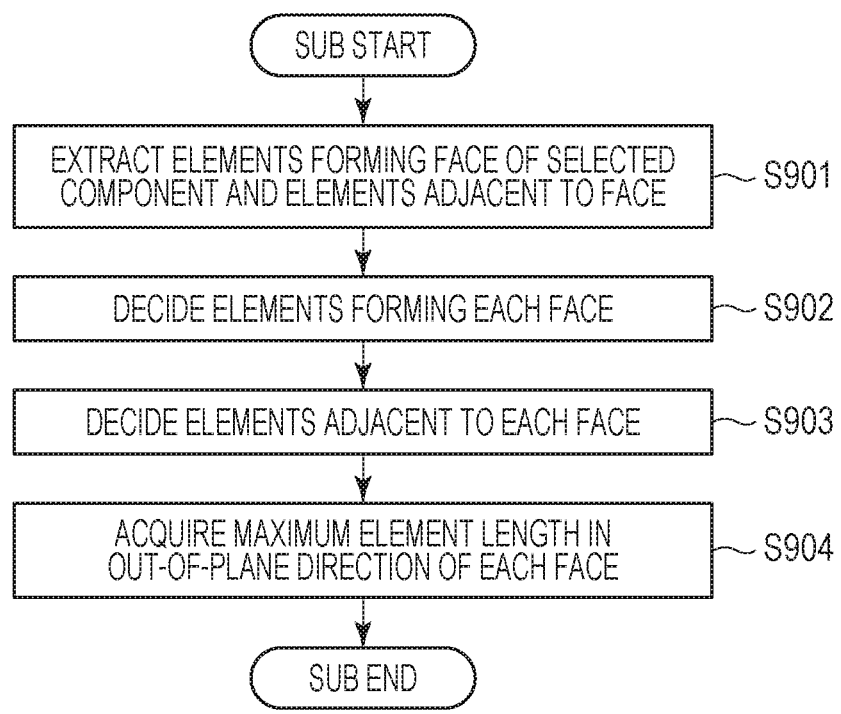
FIG. 9 is a flowchart illustrating a flow of processing performed in a second judgment unit of the exemplary embodiment 1.

The flow of the processing performed in the determination unit 202 is as described above. Next, the processing performed by the association unit 204 (step S305) will be described below in detail. FIG. 9 is a flowchart illustrating the processing of step S305 in detail. At step S901, the association unit 204 extracts elements forming the face of the component selected at step S304 and elements adjacent to the face from among all the divided elements in the element divided data input from the conversion unit 203. For example, as illustrated in FIG. 10A, as the elements forming the face of the component 401, elements 21 to 32 adjacent to an element not having an attribute of the component 401 are extracted from among the elements having the attribute of the component 401. Then, as the elements adjacent to the face of the component 401, as illustrated in FIG. 10A, elements 1 to 20 which share a face or a ridgeline with any of the elements 21 to 32 are extracted. Note that, though only elements which share a face or a ridgeline in the ±X direction and the ±Y direction of the elements having attribute information of the component 401 are represented as an element group 1001 which is extracted, elements in the ±Z direction are also to be processed actually.

At step S902, the association unit 204 determines and associates elements forming each face indicated by the first face information input from the determination unit 202 from among the elements extracted at step S901. As the elements forming each face, elements closest to an element including a coordinate at which each face exists are determined from among the elements having the attribute of the selected component 401. For example, in an example of a face 31 illustrated in FIG. 8A, elements including a coordinate at which the face 31 exists in FIG. 10A are an element 02 and an element 22. Among them, the element 02 is not an element having the attribute of the component 401, so that an element 21 closest to the element 02 among the elements having the attribute of the component 401 is determined instead of the element 02 as the element forming the face 31. That is, the element 21 and the element 22 are determined as the elements forming the face 31 as illustrated in FIG. 10B.

At step S903, the association unit 204 determines elements adjacent to each face of the selected component based on the elements forming each face, which are determined at step S902, and the normal direction of each face, which is indicated by the first information. As the elements adjacent to each face, elements which share a face or a ridgeline with the elements forming each face are selected. At this time, the normal direction of each face is considered. As the elements adjacent to each face, elements which share a face or a ridgeline with the elements forming a face and which exist in a direction of the coordinate axis having the greatest components among components of the respective coordinate axes included in the normal direction of each face compared to the elements which share the face or the ridgeline are selected. For example, in the face 31 whose normal line is in the +x direction, elements 01 to 04 which share a face or a ridgeline with the elements 21 and 22 and which have x-coordinates larger than those of the elements 21 and 22 are selected as the elements adjacent to the face 31. Further, as the elements adjacent to the face 35 which includes −x components and +y components in the normal direction and has the normal direction in which −x components are greater, following elements are determined. That is, elements 11 to 13 which share a face or a ridgeline with an element 27 and which have x-coordinates smaller than that of the element 27, and elements 14 and 15 which share a face or a ridgeline with an element 28 and which have x-coordinates smaller than that of the element 28 are determined. Note that, as the normal direction, the normal direction in the CAD data derived at step S701 do not need to be used and the normal direction may be determined based on an arrangement of the elements forming each face, which are determined at step S902.

Note that, the association unit 204 firstly determines adjacent elements corresponding to a face in contact with a different component in the CAD data. In an example of FIG. 10B, the element 06 and the element 07 which share a face with an element 23 and an element 24 forming the face 33 which has a distance of 0 mm from the component 403 are determined as the adjacent elements. Then, from among the elements other than the elements determined as the adjacent elements here, that is, elements 01 to 05 and 08 to 20 in the example of FIG. 10B, elements adjacent to remaining faces (faces which are not in contact with a component in the CAD data) are determined. The elements adjacent to the faces which are not in contact with the different component in the CAD data may be overlapping between respective faces, and, for example, the element 04 is associated with both the face 31 and the face 32.

At step S904, the association unit 204 acquires a maximum element length in an out-of-plane direction of each face based on the elements associated at step S903. The out-of-plane direction refers to the normal direction in each face of the component selected at step S901. For example, since the face 36 is in parallel to the X axis, the Y direction is the out-of-plane direction thereof, and since the face 35 has elements in a step form, the −X direction and the +Y direction are the out-of-plane direction thereof. The maximum element length refers to the longest element length among element lengths in the direction determined as the out-of-plane direction of each face. For example, since the element lengths in all the X, Y, and Z directions are 15 mm in the present exemplary embodiment, the maximum element length in the out-of-plane direction of each face is 15 mm. When the X direction and the Y direction are determined as the out-of-plane direction and the element lengths in the X direction and the Y direction are different from each other, however, the longer element length among the element lengths in the X direction and the Y direction is determined as the maximum element length in the out-of-plane direction. The association unit 204 sets numbers of the elements adjacent to each face and the maximum element length in the out-of-plane direction as second face information, and outputs the second face information to the detection unit 205. Note that, the first face information and the second face information do not need to be output separately, and may be output to the detection unit 205 as a group of data as illustrated in FIG. 10B.

Figure 11:
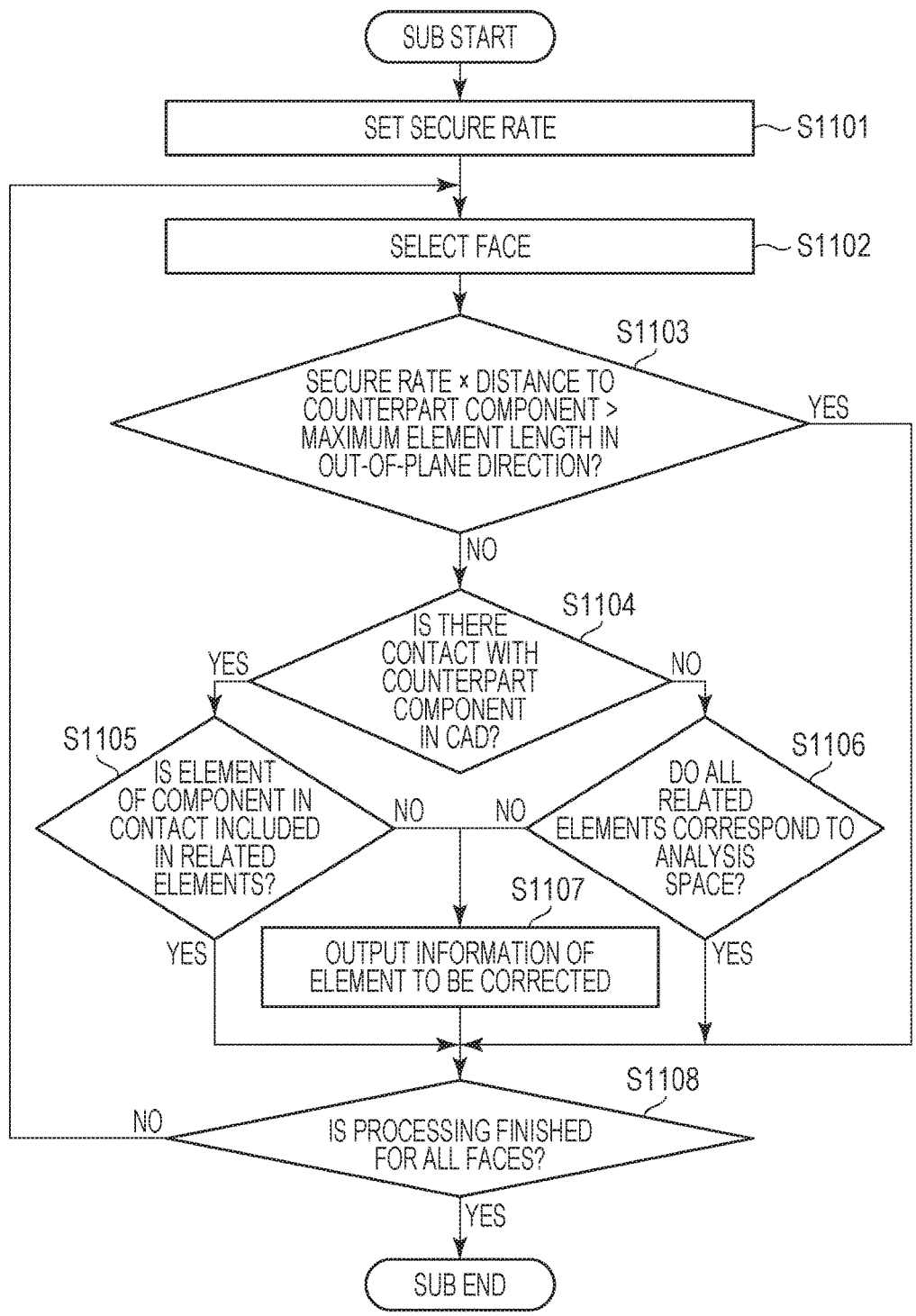
FIG. 11 is a flowchart illustrating a flow of processing performed in a comparison unit of the exemplary embodiment 1.

The flow of the processing performed by the association unit 204 (step S305) is as described above. Next, the processing performed by the detection unit 205 (step S306) will be described below in detail. FIG. 11 is a flowchart illustrating the processing performed in the detection unit 205 in detail.

At step S1101, the detection unit 205 sets a secure rate used at processing of step S1103. The secure rate will be described in detail in the description for step S1103. A coefficient in a range of 0 to 1 is used as the secure rate. Any secure rate may be set by a user or the secure rate may be set to a program or the like in advance.

At step S1102, the detection unit 205 selects one face to be processed from among a plurality of faces corresponding to the component selected at step S305, based on the first and second face information input from the determination unit 202 and the association unit 204. At step S1103, the detection unit 205 judges whether a change of a contacted state of the face selected at step S1102 needs to be checked. Specific processing of the judgment will be described below.

Whether the change of the contacted state needs to be checked is able to be judged by comparing a distance to a counterpart component at a position closest to the selected face and the maximum element length in the out-of-plane direction. This is based on an idea that a maximum value of a distance shortened between components when the CAD data is converted into the element divided data is equal to the maximum element length in the out-of-plane direction. However, such a premise may not be always adapted when the selected face is inclined to a direction of element division, and there is a case where a face in which a contacted state changes is missed, when simply the distance between the components and the maximum element length are compared. Thus, the detection unit 205 in the present exemplary embodiment sets the secure rate at step S1101. Then, by comparing a value obtained by multiplying the distance to the component at a position closest to the selected face by the secure rate to the maximum element length in the out-of-plane direction of the selected face, whether the change of the contact relationships of the selected face needs to be checked is judged.

Figure 12A:
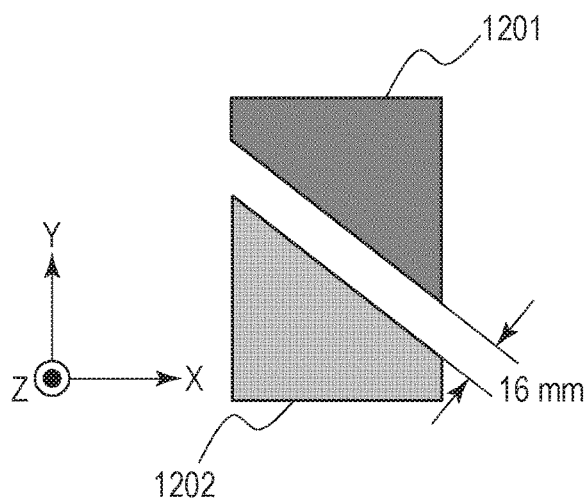
FIGS. 12A to 12C are diagrams for explaining a concept of a secure rate.
Figure 12B:
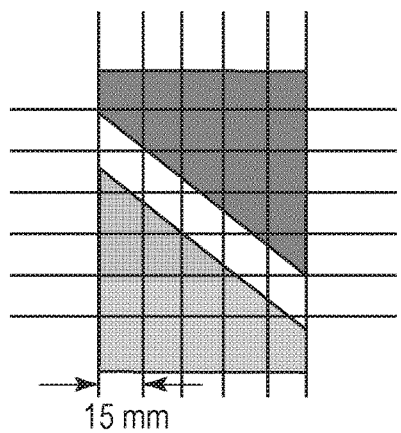
Figure 12C:
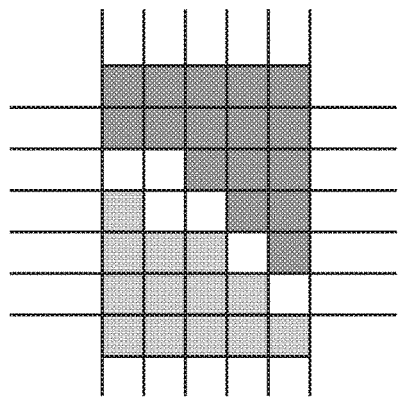

The principle thereof will be described with reference to FIGS. 12A to 12C. FIG. 12A is a diagram illustrating CAD data including a component 1201 and a component 1202 which have opposing faces inclined to a principal coordinate axis and which has an interval of 16 mm therebetween. Considered is a case where element division is performed for the CAD data with an element length of 15 mm, which is shorter than a distance between the components, in respective X, Y and Z axes as illustrated in FIG. 12B, and element divided data illustrated in FIG. 12C is generated. As illustrated in FIG. 12C, since the opposing faces of the component 1201 and the component 1202 are inclined to the principal coordinate axis, the respective faces are in a step form in the element divided data and the component 1201 and the component 1202 are in contact at two places. The contacted places are missed when the distance between the components and the maximum element length are simply compared without using the secure rate, but when the comparison is performed by using the secure rate, the face in which the change of the contact relationships needs to be checked is able to be detected even when the component 1201 and the component 1202 are in contact at two places. When the secure rate is set to, for example, 0.8, the value obtained by multiplying the distance between the components by the secure rate is provided by 0.8×16 mm=12.8 mm, which is shorter than the maximum element length in the out-of-plane direction of 15 mm, so that the change of the contact relationships is checked also for the face. Then, elements in which the contact relationships are changed become possible to be extracted and corrected. Note that, a uniform value may be set in advance to the secure rate or the secure rate may be changed adaptively according to an angle of each face.

At step S1103, the detection unit 205 judges whether the value obtained by multiplying the distance to the counterpart component by the secure rate is greater than the maximum element length in the out-of-plane direction. When it is judged that the value obtained by multiplying the distance to the counterpart component by the secure rate is greater than the maximum element length in the out-of-plane direction, the change of the contact relationships of the face does not need to be checked, so that the procedure proceeds to step S1108. When it is judged that the value obtained by multiplying the distance to the counterpart component by the secure rate is equal to or less than the maximum element length in the out-of-plane direction, the change of the contact relationships of the face needs to be checked, so that the procedure proceeds to step S1104.

At step S1104, the detection unit 205 judges whether there is a component in contact with the selected face in the CAD data. For this judgment, a value of the distance to the counterpart component, which is included in the first face information, is used. The face having the distance to the counterpart component of 0 is judged as the face with which a component is in contact. When it is judged that there is a component in contact in the CAD data, the procedure proceeds to step S1105. When it is judged that there is no component in contact in the CAD data, the procedure proceeds to step S1106.

At step S1105, the detection unit 205 judges whether an element having an attribute of the component which is in contact in the CAD data is included in the elements adjacent to the selected face in the element divided data. This judgment is performed by checking an attribute of the corresponding element of the element divided data by the detection unit 205. Note that, the judgment may be performed before by the association unit 204 and a result of the judgment may be added in advance to the second face information. When it is judged that an element having the attribute of the component which is in contact in the CAD data is included, there is no change of the contact relationships between the CAD data and the element divided data, so that the procedure proceeds to step S1108. When it is judged that an element having the attribute of the component which is in contact in the CAD data is not included, there is the change of the contact relationships between the CAD data and the element divided data, so that the procedure proceeds to step S1107.

At step S1106, the detection unit 205 judges whether all the elements adjacent to the selected face are elements corresponding to the analysis space in the element divided data. This judgment is performed by checking the attribute of the corresponding element of the element divided data by the detection unit 205 similarly to step S1105. When it is judged that all the elements adjacent to the selected face are elements corresponding to the analysis space, there is no change of the contact relationships between the CAD data and the element divided data, so that the procedure proceeds to step S1108. When it is judged that an element not corresponding to the analysis space is included in the elements adjacent to the selected face, the procedure proceeds to step S1107.

At step S1107, the detection unit 205 determines a number of an element to be corrected and correction contents and performs outputting to the correction unit 206. Specifically, when an element having the attribute of the component is included in the elements adjacent to the face which is not in contact with the component in the CAD data, an instruction of changing an attribute of the element to the analysis space is output to the correction unit 206. When an element having an attribute of other than the component in contact is included in the related elements of the face in contact with the component in the CAD data, an instruction of changing an attribute of the element to the attribute of the component in contact in the CAD data is output to the correction unit 206. That is, the processing at steps S1105 to S1107 is processing in which when an attribute of a block adjacent to each face is different from an attribute which is predicted from information indicating the contacted state, the attribute of the block is corrected to the predicted attribute.

At step S1108, the detection unit 205 judges whether all the faces have been selected. When it is judged that all the faces have not been selected, the procedure returns to step S1102 at which a new face is selected, and processing subsequent to step S1103 is performed. When it is judged that all the faces have been selected, information indicating that checking for all the faces is finished is output to the correction unit 206 and the procedure ends.

The detailed processing performed by the detection unit 205 of the present exemplary embodiment is as described above. With the processing above, checking of the contacted state is able to be omitted for a part of faces, so that a processing amount required to generate element divided data in which a contacted state of components in CAD data is maintained is able to be reduced.

Note that, in the present exemplary embodiment, the acquisition unit 201 functions as an input unit configured to input shape data indicating shapes and positional relationships of a plurality of objects. The conversion unit 203 functions as a generation unit configured to, in a space formed by a plurality of blocks each having a predetermined size, generate block data in which a corresponding attribute of an object or a space is allocated to each of the plurality of blocks. The detection unit 205 functions as a determination unit configured to determine a part of blocks adjacent to a block having the attribute of the object, as a block used for processing for detecting a difference of a contacted state of the plurality of objects between the shape data and the block data. The detection unit 205 also functions as a detection unit configured to detect the difference of the contacted state by using the block determined as being used for the detection processing by the determination unit among the blocks adjacent to the block having the attribute of the object. The determination unit 202 functions as an acquisition unit configured to, for each face of the plurality of objects, acquire information indicating a contacted state of each face and a different object in the shape data. The determination unit 202 also functions as a distance acquisition unit configured to, for a plurality of faces of the plurality of objects in the shape data, acquire a distance from each of the faces to the different object. The association unit 204 functions as an extraction unit configured to, for each face of the plurality of objects, extract a block adjacent to each face. The correction unit 206 functions as a correction unit configured to, when the difference of the contacted state of the plurality of objects is detected between the shape data and the block data, correct an attribute of a part of blocks of the block data.

Exemplary Embodiment 2

Description has been given in the exemplary embodiment 1 for a method for omitting checking of a change of contact relationships for a part of faces based on a distance between components in CAD data and an element length in element divided data to thereby efficiently create an analysis model in which the contact relationships in the CAD data is maintained. In the present exemplary embodiment, a description will be given for an example in which based on whether relationships of physical properties of each component fulfill a predetermined condition, checking of a change of contact relationships is further omitted to create an analysis model more efficiently.

Description has been given in the exemplary embodiment 1 for a method for detecting a change of contact relationships so as to reduce influence on accuracy of computation when performing numerical analysis of physical properties of components. However, depending on a value of physical properties of materials of components, influence on accuracy of computation is small even when contact relationships change. For example, when electromagnetic analysis of components is performed, influence on accuracy of computation is small even when contact relationships of components of an insulator, which has low conductivity and in which current is hard to flow, change. Thus, a description will be given in the present exemplary embodiment for an example in which when a closest component is made of a nonconductive material in CAD data, checking of a change of contact relationships is omitted to thereby further reduce a processing amount required to correct element divided data.

A description will be given below for specific processing in the present exemplary embodiment.

Though specific processing of the present exemplary embodiment is basically similar to that of the exemplary embodiment 1, the present exemplary embodiment is different from the exemplary embodiment 1 in contents of first face information generated by the determination unit 202 and judgment processing at step S305. First, an example of first face information generated by the determination unit 202 in the present exemplary embodiment is illustrated in FIG. 13. The first face information in the present exemplary embodiment further includes information indicating a material of a counterpart component and information indicating a material of an own component in addition to a number of a counterpart component corresponding to each face and a distance thereto. For example, the materials of both of the component 401 having the face 31 and the component 402 closest to the face 31 are iron and have conductivity. On the other hand, the material of the component 404 closest to the face 34 is resin and does not have conductivity. Note that, information of physical properties included in the first face information is not limited to information indicating a material itself and may include, for example, information indicating conductivity of each material instead.

Figure 14:
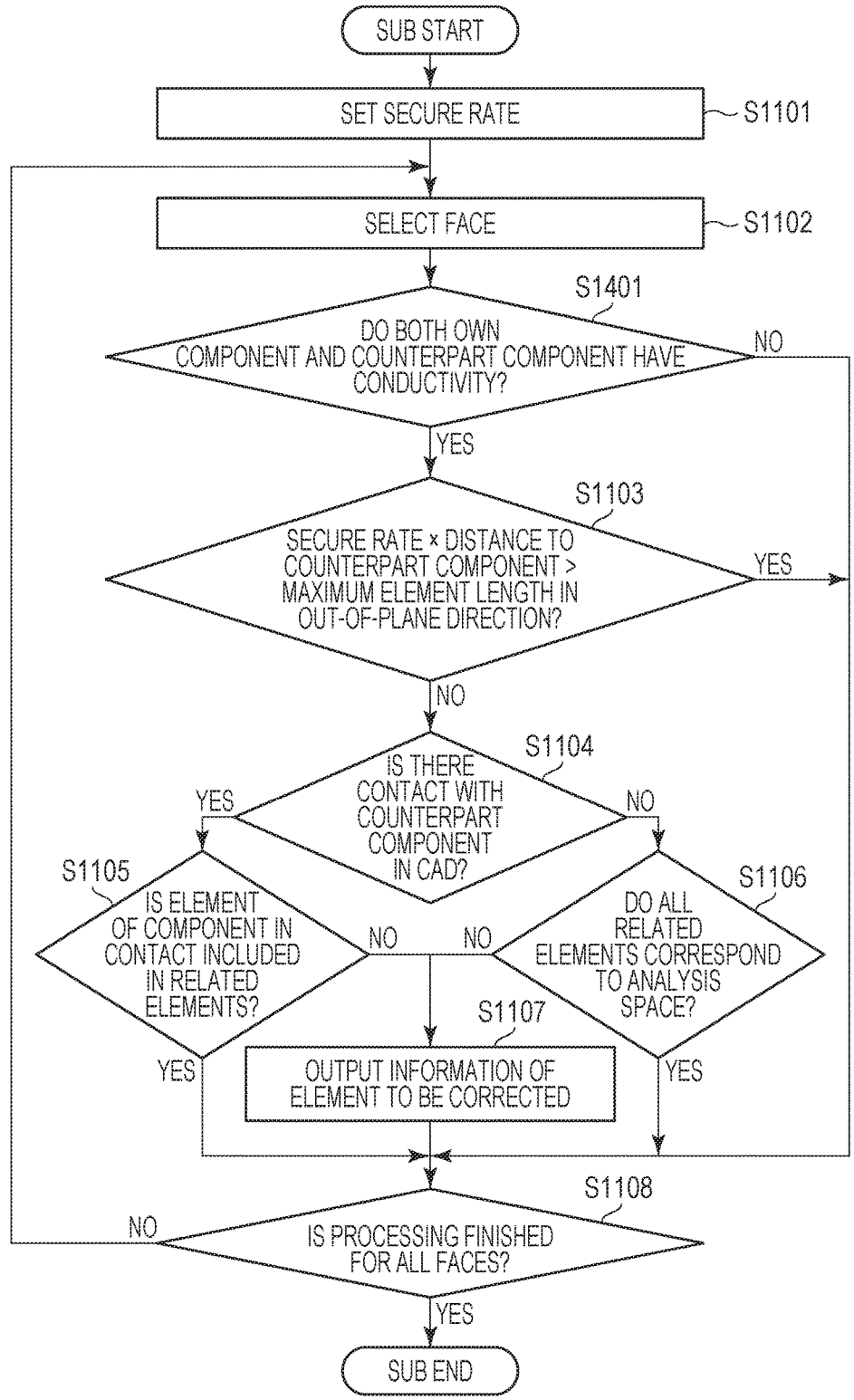
FIG. 14 is a flowchart illustrating a flow of processing performed in a comparison unit of the exemplary embodiment 2.

FIG. 14 is a flowchart illustrating a flow of the processing performed by the detection unit 205 of the present exemplary embodiment. While a basic flow is similar to that of the processing in the exemplary embodiment 1, step S1401 which is new judgment processing is added before step S1103.

At step S1401, the detection unit 205 judges whether materials of both of an own component and a counterpart component of the selected face are conductive. For judging whether a conductive material is included, information indicating a material, which is included in the first face information, is used. A database indicating conductive materials and nonconductive materials is prepared in advance in the ROM 103 or the secondary storage device 104, and the detection unit 205 judges whether the materials of the own component and the counterpart component are conductive by comparison to the database. When the materials of both of the own component and the counterpart component are conductive, there is a possibility that the change of the contacted state of the selected face needs to be checked, so that the procedure proceeds to step S1103. When the material of at least one of the own component and the counterpart component is nonconductive, the change of the contacted state of the selected face does not need to be checked, so that the procedure proceeds to step S1108.

Note that, the judgment of a nonconductive material here does not need to be always performed with the aforementioned method, and, for example, when conductivity of each component is included in the first face information, the judgment of a nonconductive material may be performed based on whether or not the conductivity is greater than a threshold. The judgment may be performed in such a manner that a nonconductive material is excluded from a target of a component to be selected by the determination unit 202 and the association unit 204 so that a face of a nonconductive component is out of a target of processing. In this case, the first face information does not need to keep information indicating physical properties of the own component. In addition, when numerical analysis using element divided data is not electromagnetic analysis but thermodynamic analysis, necessity of checking of the contacted state may be judged based on thermal conductivity of each component. That is, when the thermal conductivity of both of the own component and the counterpart component is equal to or more than a predetermined threshold, the change of the contacted state of the selected face needs to be checked, so that the procedure proceeds to step S1103.

Figure 15:
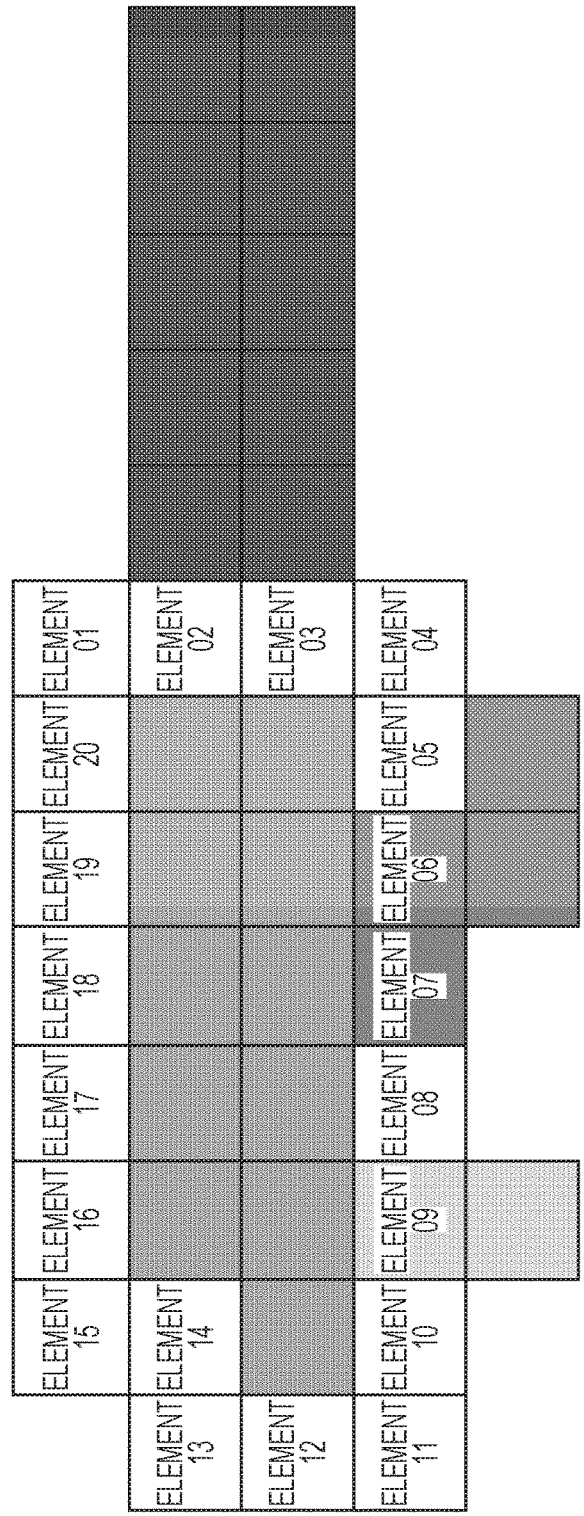
FIG. 15 is a diagram illustrating a method for correcting element divided data in the exemplary embodiment 2.

FIG. 15 is a diagram illustrating an example of correction of element divided data in the present exemplary embodiment. An element 09 is an element adjacent to a face in which components are not in contact in CAD data, but is excluded from a target of correction because a component 404 corresponding to the element 09 is made of a nonconductive material. A summary of the processing performed in the exemplary embodiment 2 is as described above. With the processing above, it is possible to further reduce a processing amount required to generate element divided data used for numerical analysis of physical properties.

Exemplary Embodiment 3

Description has been in the exemplary embodiment above for an example in which faces are read for each component and elements corresponding to each of the faces are read to thereby correct element divided data. A description will be given in the present exemplary embodiment for an example in which each element is referred to in turn in element divided data and information indicating relationships between each element and a face is read to thereby correct the element divided data.

Figure 16:
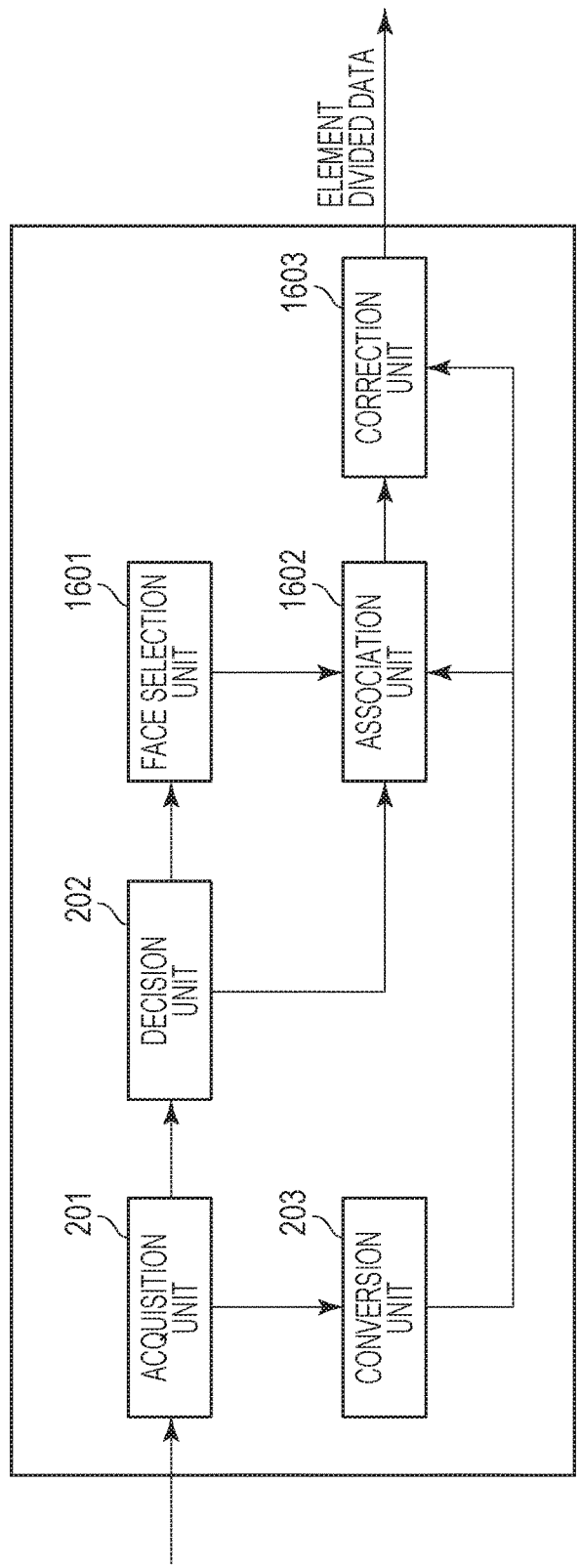
FIG. 16 is a block diagram illustrating a functional configuration of an information processing apparatus according to an exemplary embodiment 3.
Figure 17:
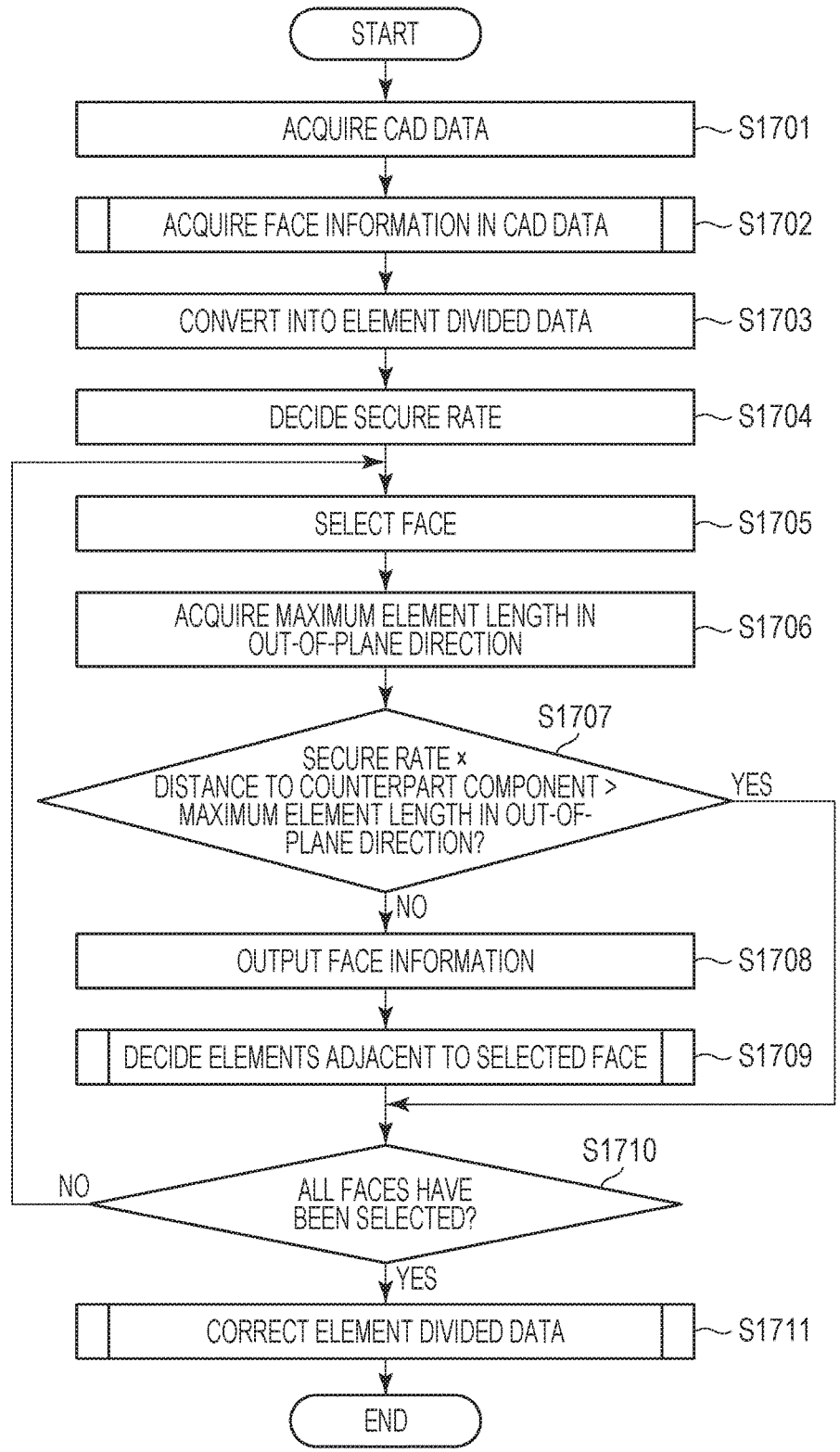
FIG. 17 is a flowchart illustrating a flow of processing performed in the information processing apparatus according to the exemplary embodiment 3.

Processing performed in a processing apparatus 100 of an exemplary embodiment 3 will be described below with reference to FIG. 16 and FIG. 17. FIG. 16 is a block diagram illustrating a functional configuration of the processing apparatus 100 in the exemplary embodiment 3. The processing apparatus 100 functions as each constituent unit illustrated in FIG. 16 when the CPU 101 executes the program stored in the ROM 103 with the RAM 102 as a working memory and executes a series of processing illustrated in a flowchart in FIG. 17. Note that, all following processing does not need to be executed by the CPU 101, and the processing apparatus 100 may be configured so that a part or all of the processing is performed by one or more processing circuits other than the CPU 101. A flow of processing performed by each constituent unit will be described below.

At step S1701, the acquisition unit 201 acquires CAD data to be processed, which is stored in the secondary storage device 104 or the like, and outputs the CAD data to the determination unit 202 and the conversion unit 203. At step S1702, the determination unit 202 judges a contacted state of each component in the CAD data input from the acquisition unit 201. The processing here is similar to that of step S302, so description thereof will be omitted. The determination unit 202 outputs first face information indicating the contacted state of each component in the CAD data to a face selection unit 1601 and an association unit 1602. At step S1703, the conversion unit 203 converts the CAD data input from the acquisition unit 201 to element division data used for analysis, and outputs the resultant element divided data to the association unit 1602 and a correction unit 1603. The conversion to the element divided data, which is performed here, is similar to the processing at step S303, so description thereof will be omitted.

At step S1704, the face selection unit 1601 determines a secure rate. The secure rate determined here is similar to the secure rate determined at step S1101, so description thereof will be omitted. At step S1705, the face selection unit 1601 selects one face from among faces indicated by the first face information input from the determination unit 202. At step S1706, the face selection unit 1601 acquires a maximum element length in an out-of-plane direction of the face selected at step S1705. This processing is similar to the processing performed at step S904, so description thereof will be omitted.

At step S1707, the face selection unit 1601 judges whether a change of contact relationships of the face selected at step S1705 needs to be checked. The judgment processing performed here is similar to that of step S1102, so description thereof will be omitted. When it is judged that the change of the contact relationships of the selected face needs to be checked, the procedure proceeds to step S1708. When it is judged that the change of the contact relationships of the selected face does not need to be checked, the procedure proceeds to step S1710.

At step S1708, the face selection unit 1601 outputs information indicating an ID of the selected face to the association unit 1602. At step S1709, the association unit 1602 refers to the first face information input from the determination unit 202 based on the face ID input from the face selection unit 1601. Then, elements adjacent to the face selected at step S1705 are determined with respect to the element divided data input from the conversion unit 203. The detailed processing here will be described below. The association unit 1602 outputs information indicating the elements adjacent to the selected face to the correction unit 1603.

At step S1710, the face selection unit 1601 judges whether all the faces indicated by the first face information have been selected at step S1705. When it is judged that all the faces have been selected, the procedure proceeds to step S1711. When it is judged that all the faces have not been selected, the procedure returns to step S1705 at which a new face is selected.

At step S1711, the correction unit 1603 corrects the element divided data, which is input from the conversion unit 203, based on the information indicating the element adjacent to each face, which is input from the association unit 1602. The detailed processing here will be described below.

Figure 18:
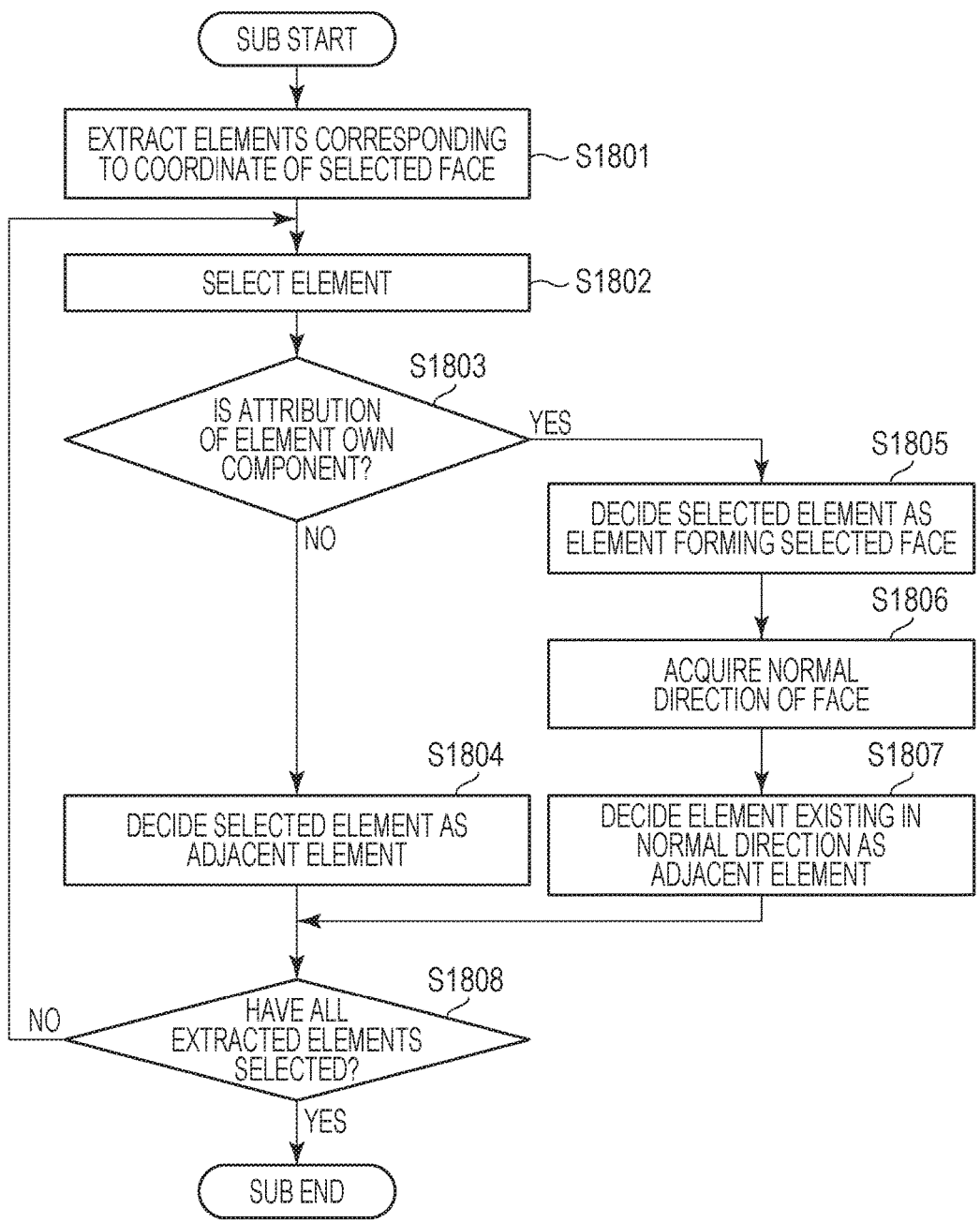
FIG. 18 is a flowchart illustrating a flow of processing performed in an association unit of the exemplary embodiment 3.

The flow of the processing performed in the processing apparatus 100 of the present exemplary embodiment is as described above. Next, processing performed in each constituent unit will be described in detail. First, details of the processing for determining the adjacent elements performed by the association unit 1602 (step S1709) will be described with reference to a flowchart illustrated in FIG. 18.

At step S1801, the association unit 1602 extracts elements corresponding to a coordinate of the face input from the face selection unit 1601 in the element divided data input from the conversion unit 203. That is, the association unit 1602 determines the elements including the coordinate, at which the selected face exists in the CAD data, in the element divided data, and extracts the elements therefrom.

At step S1802, the association unit 1602 selects one of the elements extracted at step S1801. At step S1803, the association unit 1602 judges whether an attribute of the element selected at step S1802 is an attribute of a component forming the selected face. When it is judged that the attribute of the selected element is not the attribute of the component forming the selected face, the procedure proceeds to step S1804. When it is judged that the attribute of the selected element is the attribute of the component forming the selected face, the procedure proceeds to step S1805.

At step S1804, the association unit 1602 determines the element selected at step S1802 as the element adjacent to the selected face. In the present exemplary embodiment, a table as illustrated in FIG. 20A illustrating a face to which each element is adjacent and a face formed by each element is stored in the RAM 102 of the processing apparatus 100. Note that, information of a face to which each element is adjacent and a face formed by each element is not stored in an initial state. The association unit 1602 inputs the ID of the face selected at step S1705 to information of the face to which the element determined here as the element adjacent to the selected face is adjacent. Note that, a plurality of faces to which one element is adjacent are detected, IDs of all the detected faces are input.

At step S1805, the association unit 1602 determines the element selected at step S1802 as the element forming the selected face. Then, the ID of the face selected at step S1705 is input to the information of the face formed by the selected element in the table illustrated in FIG. 20B.

At step S1806, the association unit 1602 acquires a main normal direction of the selected face, which is indicated by the first face information. At step S1807, the association unit 1602 determines, as the element adjacent to the selected face, the element existing in the main normal direction acquired at step S1806 among elements adjacent to the selected element. Then, an ID of the selected face is input to information of the face to which the element determined as the adjacent element is adjacent in the table illustrated in FIG. 20B.

A summary of the processing above will be described with reference to FIG. 10A. In FIG. 10A, when the face 35 is selected, elements 14, 27 and 28 are extracted as elements including a coordinate of the face 35. In this case, the element 14 is an element which does not have the attribute of the own component, and thus selected as the element adjacent to the selected face. Moreover, both of the element 27 and the element 28 are elements which have the attribute of the own component, and thus determined as elements forming the face. Further, elements 11 to 15 which are adjacent to the element 27 or the element 28 and which exist in the −x direction which is a main normal direction of the face 35 are determined as elements adjacent to the selected elements. With processing as described above, it is possible to determine relationships between each element and the selected face efficiently.

At step S1808, the association unit 1602 judges whether judgment of adjacent/forming is performed for all the elements extracted at step S1801. When it is judged that the judgment of adjacent/forming is not performed for all the elements extracted at step S1801, the procedure returns to step S1802 at which a new element is selected. When it is judged that the judgment of adjacent/forming is performed for all the elements extracted at step S1801, the procedure ends.

Figure 19:
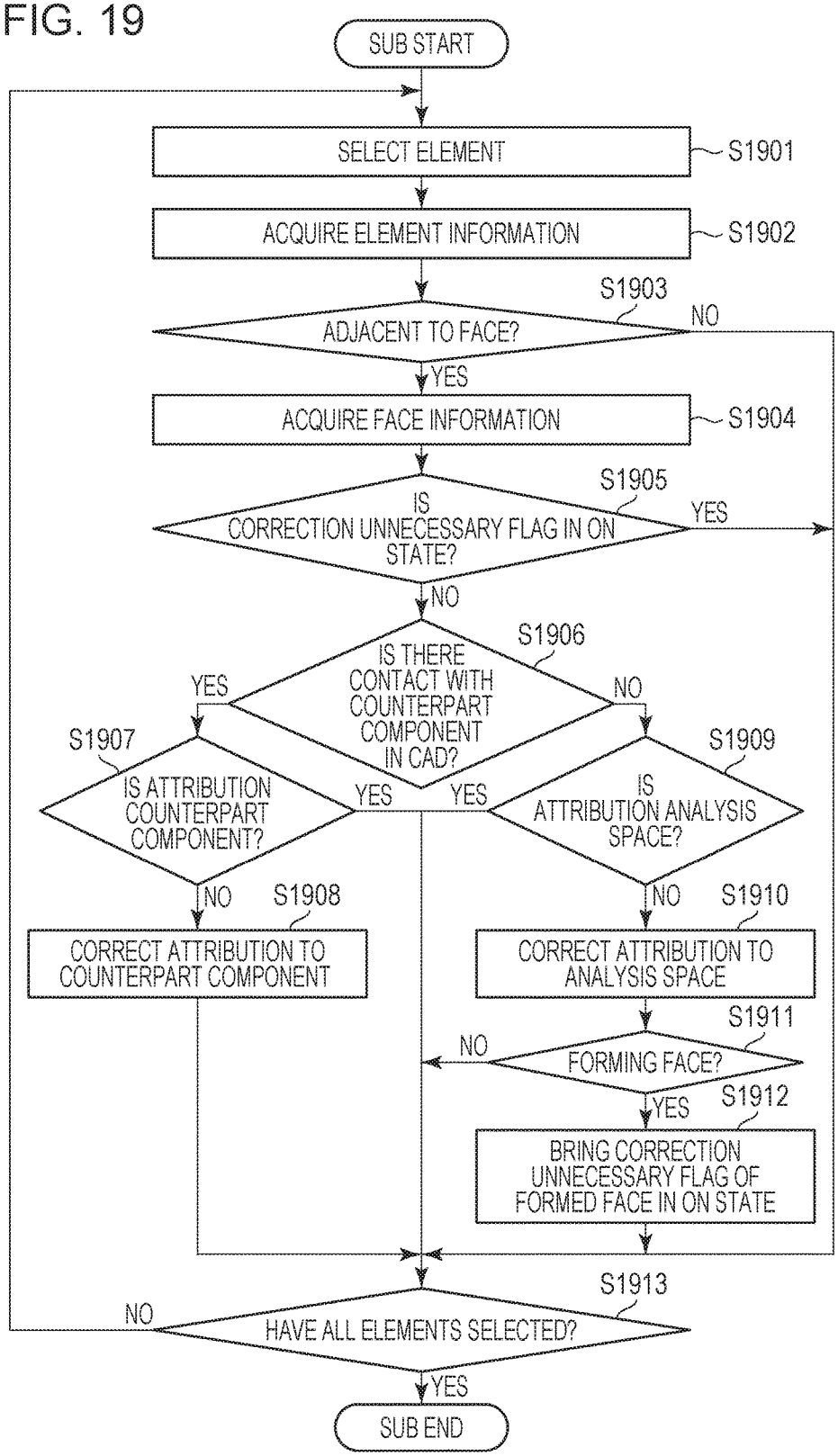
FIG. 19 is a flowchart illustrating a flow of processing performed in a correction unit of the exemplary embodiment 3.

The flow of the processing performed in the association unit 1602 of the present exemplary embodiment is as described above. Next, processing performed by the correction unit 1603 (step S1711) will be described in detail with reference to a flowchart illustrated in FIG. 19.

At step S1901, the correction unit 1603 selects one of the elements included in the element divided data input from the conversion unit 203. Since the element correction processing performed here is raster processing, for example, all the elements are selected sequentially from the upper left to the lower right in a space indicated by the element divided data.

At step S1902, the correction unit 1603 acquires element information of the element selected at step S1901. Specifically, a table indicating adjacent/forming faces, which is illustrated in FIG. 20A, is referred to.

At step S1903, the correction unit 1603 judges whether the element selected at step S1901 is adjacent to the face based on the element information acquired at step S1902. When it is judged that the selected element is adjacent to the face, the procedure proceeds to step S1904. When it is judged that the selected element is not adjacent to the face, the procedure proceeds to step S1913.

At step S1904, the correction unit 1603 acquires information of the face to which the selected element is adjacent. The table as illustrated in FIG. 20B is stored in the RAM 102 of the processing apparatus 100 of the present exemplary embodiment. In the table, for each face, an ID of a component in contact with the face, and flag information indicating whether correction of an attribute of an element adjacent to the face is unnecessary are stored. The correction unit 1603 refers to information of a corresponding part of the face to which the selected element is adjacent in the table illustrated in FIG. 20B. Note that, an input is always made to the table by the face selection unit 1601 at step S1708.

At step S1905, the correction unit 1603 judges whether a correction unnecessary flag of the face to which the selected element is adjacent is in an on state. Note that, 1 indicates an on state of the flag and 0 indicates an off state of the flag in the example of FIG. 20B. When it is judged that the correction unnecessary flag of the face to which the selected element is adjacent is not in the on state, the procedure proceeds to step S1906. When it is judged that the correction unnecessary flag of the face to which the selected element is adjacent is in the on state, the procedure proceeds to step S1913. Note that, in a case where there are a plurality of faces to which the selected element is adjacent, when the correction unnecessary flag is in the on state in all of the adjacent faces, the procedure proceeds to step S1913, and when the face whose correction unnecessary flag is not in the on state is included, the procedure proceeds to step S1906.

At step S1906, the correction unit 1603 judges whether the face to which the selected element is adjacent contacts a different component in the CAD data. When it is judged that the face to which the selected element is adjacent contacts a different component in the CAD data, the procedure proceeds to step S1907. When it is judged that the face to which the selected element is adjacent does not contact a different component in the CAD data, the procedure proceeds to step S1909. Note that, in a case where there are a plurality of faces to which the selected element is adjacent and whose correction unnecessary flag is not in the on state, the judgment at step S1906 is performed in accordance with face information of the face which has the smallest face number among them.

At step S1907, the correction unit 1603 refers to the attribute of the selected element and judges whether the attribute of the selected element is the attribute of the counterpart component with which the adjacent face is in contact. When it is judged that the attribute of the selected element is not the attribute of the counterpart component, the procedure proceeds to step S1908. When it is judged that the attribute of the selected element is the attribute of the counterpart component, the procedure proceeds to step S1913.

At step S1908, the correction unit 1603 corrects the attribute of the selected element to the attribute of the counterpart component of the adjacent face, and the procedure proceeds to step S1913.

At step S1909, the correction unit 1603 refers to the attribute of the selected element and judges whether the attribute of the selected element is the analysis space. When it is judged that the attribute of the selected element is not the analysis space, the procedure proceeds to step S1901. When it is judged that the attribute of the selected element is the analysis space, the procedure proceeds to step S1913.

At step S1910, the correction unit 1603 corrects the attribute of the selected element to the analysis space. At step S1911, the correction unit 1603 judges whether the element whose attribute is corrected to the analysis space at step S1910 is an element forming the face. When it is judged that the element whose attribute is corrected to the analysis space at step S1910 is the element forming the face, the procedure proceeds to step S1912. When it is judged that the element whose attribute is corrected to the analysis space at step S1910 is not the element forming the face, the procedure proceeds to step S1913.

At step S1912, the correction unit 1603 makes the correction unnecessary flag of the face formed by the element whose attribute is corrected to the analysis space at step S1910 in the on state, and the procedure proceeds to step S1913. With this processing, there is no concern that processing for changing an attribute is performed in duplicate in a plurality of faces adjacent to each other.

At step S1913, the correction unit 1603 judges whether all the elements of the element divided data input from the conversion unit 203 have been selected. When it is judged that all the elements have not been selected, the procedure returns to step S1901 at which the correction unit 1603 selects a new element. When it is judged that all the elements have been selected, the correction unit 1603 outputs the element divided data for which correction has been finished, and the processing ends.

The processing in the present exemplary embodiment is as described above. According to the processing above, by using a method different from that of the exemplary embodiment 1, it is possible to reduce a processing amount required to generate element divided data in which a contacted state of components in CAD data is maintained.

Note that, each constituent unit has a function as a following unit in the present exemplary embodiment. The face selection unit 1601 functions as a determination unit configured to determine a part of blocks adjacent to a block having the attribute of the object as a block used for processing for detecting a difference of the contacted state of the plurality of objects between the shape data and the block data. The association unit 1602 functions as an extraction unit configured to, for each face of the plurality of objects, extract a block adjacent to each face from the block data. The correction unit 1603 functions as a detection unit configured to detect the difference of the contacted state by using the block determined as being used for the detection processing by the determination unit among the blocks adjacent to the block having the attribute of the object. The correction unit 1603 also functions as a correction unit configured to, when the difference of the contacted state of the plurality of objects is detected between the shape data and the block data, correct an attribute of a part of blocks of the block data.

Other Exemplary Embodiment

Exemplary embodiments of the invention are not limited to the three exemplary embodiments above. For example, even when the processing at S1103 is omitted from the exemplary embodiment 2 so that only judgment based on physical properties is performed, it is possible to achieve reduction of a processing amount even though lower effect is provided. Further, a part of the processing of the three exemplary embodiments above may be replaced with processing of a different exemplary embodiment. For example, the judgment of an adjacent element performed in the exemplary embodiment 1 may be replaced with a method for determining an adjacent element in the exemplary embodiment 3, or whether to perform determination of an adjacent element may be determined based on a maximum element length in an out-of-plane direction and a distance to a closest component in the exemplary embodiment 1.

Though the element which is detected by the detection unit 205 to be required to be corrected is corrected automatically by the correction unit 206 in the exemplary embodiments above, the correction may be performed in a different manner. For example, the element which is detected by the detection unit 205 to be required to be corrected may be notified to a user through a display on the display device 109 and the user may be prompted to perform the correction of the element manually. Though an example in which whether checking of a change of a contacted state needs to be performed is judges for all the components in the exemplary embodiments above, the user may perform the processing above only for a part of the components, which is specified by the user.

Though the judgment processing at step S1103 is performed by comparing a value obtained by multiplying a secure rate by a distance to a counterpart component with the secure rate as a coefficient 0 to 1 to a maximum element length in an out-of-plane direction in the exemplary embodiments above, the judgment may be performed by a different method. For example, when a difference between the distance to the counterpart component and the maximum element length in the out-of-plane direction is greater than a predetermined threshold, it may be judges that a change of a contacted state of a selected face does not need to be checked. Moreover, the judgment at step S1103 may be performed by comparing a value obtained by multiplying the maximum element length in the out-of-plane direction by a coefficient greater than 1 to the distance to the counterpart component. The invention may be realized by processing in which a program realizing one or more functions of the exemplary embodiments described above is supplied to a system or an apparatus through a network or a storage medium, and one or more processors in a computer of the system or the apparatus is read and executed. In addition, the invention may be realized also by a circuit realizing one or more functions (for example, ASIC).

According to the present exemplary embodiments, it is possible to reduce a processing amount required to generate element divided data in which a contacted state of components in CAD data is maintained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-072871, filed on Mar. 31, 2015, which is hereby incorporated by reference herein in its entirety.

What is claimed is:

1. An information processing apparatus, comprising:
one or more memories that store instructions; and
one or more processors which, when executing the instructions, cause the information processing apparatus to implement operations to:
input shape data indicating shapes and positional relationships of a plurality of objects;
generate block data in which a corresponding attribute of an object or a space is allocated to each of the plurality of blocks, based on the shapes and the positional relationships of the plurality of objects, which are indicated by the shape data, in a space formed by a plurality of blocks each having a predetermined size;
determine a part of blocks adjacent to a block having the attribute of the object in the block data as a block used for processing for detecting a difference between a contacted state of the plurality of objects in the shape data and a contacted state of the plurality of objects in the block data, based on the positional relationships or physical properties of the plurality of objects, which are indicated by the shape data, wherein the contacted state indicates whether the plurality of objects contact each other or not; and
detect the difference between the contacted states by using the block determined as being used for the detection processing among the blocks adjacent to the block having the attribute of the object.

2. The information processing apparatus according to claim 1, wherein the information processing apparatus further implements operations to, when a difference is detected between the contacted state of the plurality of objects in the shape data and the contacted state of the plurality of objects in the block data, correct an attribute of a part of the blocks of the block data so that a contacted state of at least a part of the plurality of objects becomes the same in the shape data and the block data, where the attribute is information representing the contacted state.

3. The information processing apparatus according to claim 2, wherein the information processing apparatus further implements operations to, for each face of the plurality of objects, acquire information indicating a contacted state of each face and a different object in the shape data; and
to, for each face of the plurality of objects, extract a block adjacent to each face from the block data,
wherein, when an attribute of the block adjacent to each face is different from an attribute predicted from the information indicating the contacted state, the information processing apparatus corrects the attribute of the block adjacent to each face to the attribute predicted from the information indicating the contacted state.

4. The information processing apparatus according to claim 3, wherein the information processing apparatus further implements operations to perform the attribute correction processing for a first object of the plurality of objects in the block data,
extract a block adjacent to each face of a second object different from the first object among the plurality of objects from the block data in which the attribute correction processing is performed for the first object, and
perform the attribute correction processing for the second object in the block data in which the attribute correction processing is performed for the first object.

5. The information processing apparatus according to claim 3, wherein the information processing apparatus further implements operations to extract, for each face of plurality of objects, a block forming the face from the block data, and when an attribute of the block forming the face is corrected from a component to a space in the block data, not correct an attribute of a block adjacent to the face formed by the block.

6. The information processing apparatus according to claim 1, wherein the information processing apparatus further implements operations to, when a difference is detected between the contacted state of the plurality of objects in the shape data and the contacted state of the plurality of objects in the block data, notify a user of the difference.

7. The information processing apparatus according to claim 1, wherein the information processing apparatus further implements operations to, for a plurality of faces of the plurality of objects in the shape data, acquire a distance from each of the faces to a different object, and determine as a block used for the detection processing a block corresponding to a face whose distance to the different object is smaller than a predetermined threshold among blocks of the block data.

8. The information processing apparatus according to claim 7, wherein the information processing apparatus further implements operations to determine a block adjacent to, among the plurality of faces, a face whose distance to the different object is equal to or less than a maximum element length of the block data in an out-of-plane direction of the faces as a block used for the detection processing.

9. The information processing apparatus according to claim 7, wherein the information processing apparatus further implements operations to determine a block adjacent to, among the plurality of faces, a face in which a value obtained by multiplying a distance to the different object by a predetermined coefficient from 0 to 1 is equal to or less than a maximum element length of the block data in an out-of-plane direction of the faces as a block used for the detection.

10. The information processing apparatus according to claim 1, wherein the information processing apparatus further implements operations to acquire information indicating physical properties of the plurality of objects, and when in one face among a plurality of faces of the plurality of objects, relationships of physical properties between an object having the one face and an object closest to the one face fulfill a predetermined condition, determine a block adjacent to the one face as a block used for the detection processing.

11. The information processing apparatus according to claim 10, wherein the information processing apparatus further implements operations to acquire information indicating whether each of the plurality of objects is conductive or nonconductive, and when both of the object having the one face and the object closest to the one face are conductive, determine a block adjacent to the one face among the blocks of the block data as a block used for the detection processing.

12. The information processing apparatus according to claim 10, wherein the information processing apparatus further implements operations to acquire information indicating conductivity of the plurality of objects, and when conductivity of both of the object having the one face and the object closest to the one face is equal to or larger than a predetermined threshold, determine a block adjacent to the one face among the blocks of the block data as a block used for the detection processing.

13. The information processing apparatus according to claim 10, wherein the information processing apparatus further implements operations to acquire information indicating thermal conductivity of the plurality of objects, and when thermal conductivity of both of the object having the one face and the object closest to the one face is equal to or larger than a predetermined threshold, determine a block adjacent to the one face among the blocks of the block data as a block used for the detection processing.

14. The information processing apparatus according to claim 1, wherein the contacted state is a state indicating whether the plurality of objects are in contact with each other.

15. The information processing apparatus according to claim 1, wherein the shape data is CAD data.

16. An information processing method, comprising:

an input step of inputting shape data indicating shapes and positional relationships of a plurality of objects;

a generation step of, based on the shapes and the positional relationships of the plurality of objects, which are indicated by the shape data, in a space formed by a plurality of blocks each having a predetermined size, generating block data in which a corresponding attribute of an object or a space is allocated to each of the plurality of blocks;

a determination step of determining a part of blocks adjacent to a block having the attribute of the object in the block data as a block used for processing for detecting a difference between a contacted state of the plurality of objects in the shape data and a contacted state of the plurality of objects in the block data, based on the positional relationships or physical properties of the plurality of objects, which are indicated by the shape data, wherein the contacted state indicates whether the plurality of objects contact each other or not; and a detection step of detecting the difference between the contacted states by using the block determined as being used for the detection processing at the determination step among the blocks adjacent to the block having the attribute of the object.

17. A non-transitory computer readable recording medium in which a program caused to function as an information processing apparatus is stored, the program comprising:

an input step of inputting shape data indicating shapes and positional relationships of a plurality of objects;

a generation step of, based on the shapes and the positional relationships of the plurality of objects, which are indicated by the shape data, in a space formed by a plurality of blocks each having a predetermined size, generating block data in which a corresponding attribute of an object or a space is allocated to each of the plurality of blocks;

a determination step of determining a part of blocks adjacent to a block having the attribute of the object in the block data as a block used for processing for detecting a difference between a contacted state of the plurality of objects in the shape data and a contacted state of the plurality of objects in the block data, based on the positional relationships or physical properties of the plurality of objects, which are indicated by the shape data; and a detection step of detecting the difference between the contacted states by using the block determined as being used for the detection processing at the determination step among the blocks adjacent to the block having the attribute of the object, wherein the contacted state indicates whether the plurality of objects contact each other or not.

\* \* \* \* \*